US007451256B2

(12) United States Patent
Hagen et al.

(10) Patent No.: US 7,451,256 B2

(45) Date of Patent: Nov. 11, 2008

(54) PORTABLE SYSTEM FOR PROGRAMMING HEARING AIDS

(75) Inventors: Lawrence T. Hagen, Minnetonka, MN (US); David A. Preves, Minnetonka, MN (US)

(73) Assignee: Micro Ear Technology, Inc., Plymouth, MN (US)

(*) Notice: Subject to any disclaimer, the term of this patent is extended or adjusted under 35 U.S.C. 154(b) by 104 days.

(21) Appl. No.: 11/036,197

(22) Filed: Jan. 14, 2005

(65) Prior Publication Data

US 2005/0196002 A1 Sep. 8, 2005

Related U.S. Application Data

(63) Continuation of application No. 10/096,335, filed on Mar. 11, 2002, now Pat. No. 6,888,948, which is a continuation of application No. 08/896,484, filed on Jul. 18, 1997, now Pat. No. 6,424,722, which is a continuation-in-part of application No. 08/782,328, filed on Jan. 13, 1997, now abandoned.

(51) Int. Cl.
*G06F 13/12* (2006.01)
*G06F 3/00* (2006.01)
*H02H 5/04* (2006.01)

(52) U.S. Cl. .................. 710/72; 710/5; 710/8; 710/36; 710/62; 361/23.1

(58) Field of Classification Search ..................... 710/5, 710/8, 36, 62, 72; 381/23.1
See application file for complete search history.

(56) References Cited

U.S. PATENT DOCUMENTS 3,527,901 A 9/1970 Geib
4,188,667 A 2/1980 Graupe et al.

(Continued)

FOREIGN PATENT DOCUMENTS

DE 4339898 11/1993

(Continued)

OTHER PUBLICATIONS www.interfacebus.com/Design_Connector_RS232.html, Title: EIA-232 Bus.*

(Continued)

*Primary Examiner*—Alan Chen
(74) *Attorney, Agent, or Firm*—Schwegman, Lundberg & Woessner, P.A.

(57) ABSTRACT

A hearing aid programming system with a host computer for providing at least one hearing aid program and having at least one personal computer memory card international association (PCMCIA) defined port in combination with a PCMCIA card inserted in the port and arranged for interacting with the host computer for controlling programming of a hearing aid. The host computer provides power and ground to the PCMCIA card and provides for downloading the hearing aid programming software to the PCMCIA card upon initialization. A microprocessor on the PCMCIA card executes the programming software. A portable programming arrangement utilizes a portable multiprogram unit to store one or more hearing aid programs which may be downloaded from the host computer. The portable multiprogram unit includes a wireless interconnection for transmitting selected ones of the programs to hearing aids to be programmed.

19 Claims, 8 Drawing Sheets

U.S. PATENT DOCUMENTS 4,366,349 A 12/1982 Adelman
4,396,806 A 8/1983 Anderson
4,419,544 A 12/1983 Adelman
4,425,481 A 1/1984 Mansgold et al.
4,471,490 A 9/1984 Bellafiore
4,548,082 A 10/1985 Engebretson et al.
4,606,329 A 8/1986 Hough
4,617,429 A 10/1986 Bellafiore
4,628,907 A 12/1986 Epley
4,634,815 A 1/1987 Marquis
4,636,876 A 1/1987 Schwartz
4,637,402 A 1/1987 Adelman
4,652,702 A 3/1987 Yoshii
4,657,106 A 4/1987 Hardt
4,680,799 A 7/1987 Henneberger
4,682,248 A 7/1987 Schwartz
4,689,820 A 8/1987 Kopke et al.
4,706,778 A 11/1987 Topholm
4,712,245 A 12/1987 Lyregaard
4,731,850 A 3/1988 Levitt et al.
4,735,759 A 4/1988 Bellafiore
4,755,889 A 7/1988 Schwartz
4,756,312 A 7/1988 Epley
4,760,778 A 8/1988 Simelunas et al.
4,763,752 A 8/1988 Haertl et al.
4,776,322 A 10/1988 Hough et al.
4,791,672 A 12/1988 Nunley et al.
4,800,982 A 1/1989 Carlson
4,811,402 A 3/1989 Ward
4,815,138 A 3/1989 Diethelm
4,817,609 A 4/1989 Perkins et al.
4,834,211 A 5/1989 Bibby et al.
4,867,267 A 9/1989 Carlson
4,869,339 A 9/1989 Barton
4,870,688 A 9/1989 Voroba et al.
4,870,689 A 9/1989 Weiss
4,879,749 A 11/1989 Levitt et al.
4,879,750 A 11/1989 Nassler
4,880,076 A 11/1989 Ahlberg et al.
4,882,762 A 11/1989 Waldhauer
4,887,299 A 12/1989 Cummins et al.
4,920,570 A 4/1990 West et al.
4,937,876 A 6/1990 Biermans
4,947,432 A 8/1990 Topholm
4,953,215 A 8/1990 Weiss et al.
4,961,230 A 10/1990 Rising
4,962,537 A 10/1990 Basel et al.
4,966,160 A 10/1990 Birck et al.
4,972,487 A 11/1990 Mangold et al.
4,972,488 A 11/1990 Weiss et al.
4,972,492 A 11/1990 Tanaka et al.
4,975,967 A 12/1990 Rasmussen
4,977,976 A 12/1990 Major
4,989,251 A 1/1991 Mangold
5,002,151 A 3/1991 Oliveira et al.
5,003,607 A 3/1991 Reed
5,003,608 A 3/1991 Carlson
5,008,943 A 4/1991 Arndt et al.
5,012,520 A 4/1991 Steeger
5,014,016 A 5/1991 Anderson
5,016,280 A 5/1991 Engebretson et al.
5,027,410 A 6/1991 Williamson et al.
5,033,090 A 7/1991 Weinrich
5,044,373 A 9/1991 Northeved et al.
5,046,580 A 9/1991 Barton
5,048,077 A 9/1991 Wells et al.
5,048,092 A 9/1991 Yamagishi et al.
5,061,845 A 10/1991 Pinnavaia
5,068,902 A 11/1991 Ward
5,083,312 A 1/1992 Newton et al.
5,101,435 A 3/1992 Carlson
5,111,419 A 5/1992 Morley, Jr. et al.
5,133,016 A 7/1992 Clark
5,142,587 A 8/1992 Kobayashi
5,144,674 A 9/1992 Meyer et al.
5,146,051 A 9/1992 Hermann
5,166,659 A 11/1992 Navarro
5,185,802 A 2/1993 Stanton
5,195,139 A 3/1993 Gauthier
5,197,332 A 3/1993 Shennib
5,201,007 A 4/1993 Ward et al.
5,202,927 A 4/1993 Topholm
5,208,867 A 5/1993 Stites, III
5,210,803 A 5/1993 Martin et al.
5,220,612 A 6/1993 Tibbetts et al.
5,222,151 A 6/1993 Nagayoshi et al.
5,225,836 A 7/1993 Morley, Jr. et al.
5,226,086 A 7/1993 Platt
5,257,315 A 10/1993 Haertl et al.
5,259,032 A 11/1993 Perkins et al.
5,276,739 A 1/1994 Krokstad et al.
5,277,694 A 1/1994 Leysieffer et al.
5,282,253 A 1/1994 Konomi
5,295,191 A 3/1994 Van Vroenhoven
5,298,692 A 3/1994 Ikeda et al.
5,303,305 A 4/1994 Raimo et al.
5,303,306 A 4/1994 Brillhart et al.
5,319,163 A 6/1994 Scott
5,321,757 A 6/1994 Woodfill, Jr.
5,327,500 A 7/1994 Campbell
5,338,287 A 8/1994 Miller et al.
5,343,319 A 8/1994 Moore
5,345,509 A 9/1994 Hofer et al.
5,347,477 A 9/1994 Lee
5,357,251 A 10/1994 Morley, Jr. et al.
5,357,576 A 10/1994 Arndt
5,363,444 A 11/1994 Norris
5,365,593 A 11/1994 Greenwood et al.
5,373,149 A 12/1994 Rasmussen
5,373,555 A 12/1994 Norris et al.
5,381,484 A 1/1995 Claes et al.
5,384,852 A 1/1995 Scharen
5,387,875 A 2/1995 Tateno
5,388,248 A 2/1995 Robinson et al.
5,390,254 A 2/1995 Adelman
5,395,168 A 3/1995 Leenen
5,402,494 A 3/1995 Flippe et al.
5,402,496 A 3/1995 Soli et al.
5,404,407 A 4/1995 Weiss
5,406,619 A 4/1995 Akhteruzzaman et al.
5,416,847 A 5/1995 Boze
5,418,524 A 5/1995 Fennell
5,420,930 A 5/1995 Shugart, III
5,422,855 A 6/1995 Eslick et al.
5,425,104 A 6/1995 Shennib
5,434,924 A 7/1995 Jampolsky
5,440,449 A 8/1995 Scheer
5,445,525 A 8/1995 Broadbent et al.
5,448,637 A 9/1995 Yamaguchi et al.
5,475,759 A 12/1995 Engebretson
5,479,522 A 12/1995 Lindemann et al.
5,481,616 A 1/1996 Freadman
5,487,161 A 1/1996 Koenck et al.
5,488,668 A 1/1996 Waldhauer
5,500,901 A 3/1996 Geraci et al.
5,500,902 A 3/1996 Stockham, Jr. et al.
5,502,769 A 3/1996 Gilbertson
5,515,424 A 5/1996 Kenney
5,515,443 A 5/1996 Meyer
5,530,763 A 6/1996 Aebi et al.
5,531,787 A 7/1996 Lesinski et al.
5,533,029 A 7/1996 Gardner
5,535,282 A 7/1996 Luca
5,540,597 A 7/1996 Budman et al.

| | | | |
|---|---|---|---|
| 5,544,222 | A | 8/1996 | Robinson et al. |
| 5,546,590 | A | 8/1996 | Pierce |
| 5,553,151 | A | 9/1996 | Goldberg |
| 5,553,152 | A | 9/1996 | Newton |
| 5,555,490 | A | 9/1996 | Carroll |
| 5,559,501 | A | 9/1996 | Barzegar et al. |
| 5,561,446 | A | 10/1996 | Montlick |
| 5,572,594 | A | 11/1996 | Devoe et al. |
| 5,572,683 | A | 11/1996 | Epolite et al. |
| 5,574,654 | A | 11/1996 | Bingham et al. |
| 5,581,747 | A | 12/1996 | Anderson |
| 5,590,373 | A | 12/1996 | Whitley et al. |
| 5,602,925 | A | 2/1997 | Killion |
| 5,603,096 | A | 2/1997 | Gilhousen et al. |
| 5,604,812 | A | 2/1997 | Meyer |
| 5,606,620 | A | 2/1997 | Weinfurtner |
| 5,606,621 | A | 2/1997 | Reiter et al. |
| 5,615,344 | A | 3/1997 | Corder |
| 5,619,396 | A | 4/1997 | Gee et al. |
| 5,626,629 | A | 5/1997 | Faltys et al. |
| 5,640,490 | A | 6/1997 | Hansen et al. |
| 5,645,074 | A | 7/1997 | Shennib et al. |
| 5,649,001 | A | 7/1997 | Thomas et al. |
| 5,659,621 | A | 8/1997 | Newton |
| 5,664,228 | A | 9/1997 | Mital |
| 5,666,125 | A | 9/1997 | Luxon et al. |
| 5,671,368 | A | 9/1997 | Chan et al. |
| 5,677,948 | A | 10/1997 | Meister |
| 5,696,970 | A | 12/1997 | Sandage et al. |
| 5,696,993 | A | 12/1997 | Gavish |
| 5,708,720 | A | 1/1998 | Meyer |
| 5,710,819 | A | 1/1998 | Topholm et al. |
| 5,710,820 | A | 1/1998 | Martin et al. |
| 5,717,771 | A | 2/1998 | Sauer et al. |
| 5,717,818 | A | 2/1998 | Nejime et al. |
| 5,721,783 | A | 2/1998 | Anderson |
| 5,736,727 | A | 4/1998 | Nakata et al. |
| 5,737,706 | A | 4/1998 | Seazholtz et al. |
| 5,738,633 | A | 4/1998 | Christiansen |
| 5,740,165 | A | 4/1998 | Vannucci |
| 5,751,820 | A | 5/1998 | Taenzer |
| 5,757,933 | A | 5/1998 | Preves et al. |
| 5,784,602 | A | 7/1998 | Glass et al. |
| 5,784,628 | A | 7/1998 | Reneris |
| 5,785,661 | A | 7/1998 | Shennib |
| 5,794,201 | A | 8/1998 | Nejime et al. |
| 5,800,473 | A | 9/1998 | Faisandier |
| 5,809,017 | A | 9/1998 | Smith et al. |
| 5,812,936 | A | 9/1998 | DeMont |
| 5,812,938 | A | 9/1998 | Gilhousen et al. |
| 5,814,095 | A | 9/1998 | Muller et al. |
| 5,819,162 | A | 10/1998 | Spann et al. |
| 5,822,442 | A | 10/1998 | Agnew et al. |
| 5,824,022 | A | 10/1998 | Zilberman et al. |
| 5,825,631 | A | 10/1998 | Prchal |
| 5,825,894 | A | 10/1998 | Shennib |
| 5,827,179 | A | 10/1998 | Lichter et al. |
| 5,835,611 | A | 11/1998 | Kaiser et al. |
| 5,842,115 | A | 11/1998 | Dent |
| 5,845,251 | A | 12/1998 | Case |
| 5,852,668 | A | 12/1998 | Ishige et al. |
| 5,861,968 | A | 1/1999 | Kerklaan et al. |
| 5,862,238 | A | 1/1999 | Agnew et al. |
| 5,864,708 | A | 1/1999 | Croft et al. |
| 5,864,813 | A | 1/1999 | Case |
| 5,864,820 | A | 1/1999 | Case |
| 5,870,481 | A | 2/1999 | Dymond et al. |
| 5,878,282 | A | 3/1999 | Mital |
| 5,883,927 | A | 3/1999 | Madsen et al. |
| 5,884,260 | A | 3/1999 | Leonhard |
| 5,887,067 | A | 3/1999 | Costa et al. |
| 5,890,016 | A | 3/1999 | Tso |
| 5,909,497 | A | 6/1999 | Alexandrescu |
| 5,915,031 | A | 6/1999 | Hanright |
| 5,916,174 | A | 6/1999 | Dolphin |
| 5,917,812 | A | 6/1999 | Antonio et al. |
| 5,923,764 | A | 7/1999 | Shennib |
| 5,926,388 | A | 7/1999 | Kimbrough et al. |
| 5,926,500 | A | 7/1999 | Odenwalder |
| 5,929,848 | A | 7/1999 | Albukerk et al. |
| 5,930,230 | A | 7/1999 | Odenwalder et al. |
| 5,956,330 | A | 9/1999 | Kerns |
| 5,960,346 | A | 9/1999 | Holshouser |
| 5,987,513 | A | 11/1999 | Prithviraj et al. |
| 6,002,776 | A | 12/1999 | Bhadkamkar et al. |
| 6,009,311 | A | 12/1999 | Killion et al. |
| 6,009,480 | A | 12/1999 | Pleso |
| 6,016,115 | A | 1/2000 | Heubi |
| 6,016,962 | A | 1/2000 | Nakata et al. |
| 6,021,207 | A | 2/2000 | Puthuff et al. |
| 6,032,866 | A | 3/2000 | Knighton et al. |
| 6,035,050 | A | 3/2000 | Weinfurtner et al. |
| 6,041,046 | A | 3/2000 | Scott et al. |
| 6,041,129 | A | 3/2000 | Adelman |
| 6,058,197 | A | 5/2000 | Delage |
| 6,078,675 | A | 6/2000 | Bowen-Nielsen et al. |
| 6,084,972 | A | 7/2000 | van Halteren et al. |
| 6,088,339 | A | 7/2000 | Meyer |
| 6,088,465 | A | 7/2000 | Hanright et al. |
| 6,095,820 | A | 8/2000 | Luxon et al. |
| 6,104,822 | A | 8/2000 | Melanson et al. |
| 6,112,103 | A | 8/2000 | Puthuff |
| 6,115,478 | A | 9/2000 | Schneider |
| 6,118,877 | A | 9/2000 | Lindemann et al. |
| 6,122,500 | A | 9/2000 | Dent et al. |
| 6,144,748 | A | 11/2000 | Kerns |
| 6,149,605 | A | 11/2000 | Christiansen |
| 6,157,727 | A | 12/2000 | Rueda |
| 6,167,138 | A | 12/2000 | Shennib |
| 6,181,801 | B1 | 1/2001 | Puthuff et al. |
| 6,205,190 | B1 | 3/2001 | Antonio |
| 6,236,731 | B1 | 5/2001 | Brennan et al. |
| 6,240,192 | B1 | 5/2001 | Brennan et al. |
| 6,308,222 | B1 | 10/2001 | Krueger et al. |
| 6,320,969 | B1 | 11/2001 | Killion |
| 6,366,863 | B1 | 4/2002 | Bye et al. |
| 6,389,142 | B1 | 5/2002 | Hagen et al. |
| 6,424,722 | B1 | 7/2002 | Hagen et al. |
| 6,449,662 | B1 | 9/2002 | Armitage |
| 6,453,051 | B1 | 9/2002 | Killion |
| 6,466,678 | B1 | 10/2002 | Killion et al. |
| 6,490,427 | B2 | 12/2002 | Shields |
| 6,490,627 | B1 | 12/2002 | Kalra et al. |
| 6,493,453 | B1 | 12/2002 | Glendon |
| 6,603,860 | B1 | 8/2003 | Taenzer et al. |
| 6,606,391 | B2 | 8/2003 | Brennan et al. |
| 6,644,120 | B1 | 11/2003 | Braun et al. |
| 6,647,345 | B2 | 11/2003 | Bye et al. |
| 6,684,063 | B2 | 1/2004 | Berger et al. |
| 6,704,424 | B2 | 3/2004 | Killion |
| 6,851,048 | B2 | 2/2005 | Armitage et al. |
| 6,888,948 | B2 | 5/2005 | Hagen et al. |
| 6,895,345 | B2 | 5/2005 | Bye et al. |
| 7,054,957 | B2 | 5/2006 | Armitage |
| 2001/0007050 | A1 | 7/2001 | Adelman |
| 2001/0009019 | A1 | 7/2001 | Armitage et al. |
| 2001/0041602 | A1 | 11/2001 | Berger et al. |
| 2002/0168075 | A1 | 11/2002 | Hagen et al. |
| 2003/0014566 | A1 | 1/2003 | Armitage |
| 2004/0204921 | A1 | 10/2004 | Bye |
| 2005/0008175 | A1 | 1/2005 | Hagen, et al. |
| 2006/0074572 | A1 | 4/2006 | Bye et al. |

FOREIGN PATENT DOCUMENTS

| | | |
|---|---|---|
| DE | 19541648 | 5/1997 |

| | | | |
|---|---|---|---|
| DE | 19600234 | | 7/1997 |
| DE | 29905172 | | 7/1999 |
| EP | 341902 | | 11/1989 |
| EP | 0341902 | A2 | 11/1989 |
| EP | 341903 | | 11/1989 |
| EP | 342782 | | 11/1989 |
| EP | 363609 | | 4/1990 |
| EP | 381608 | | 8/1990 |
| EP | 448764 | | 10/1991 |
| EP | 0537026 | | 4/1993 |
| EP | 565279 | | 10/1993 |
| EP | 579152 | | 1/1994 |
| EP | 632609 | | 1/1995 |
| EP | 658035 | | 6/1995 |
| EP | 689755 | | 1/1996 |
| EP | 0726519 | A1 | 8/1996 |
| EP | 742548 | | 11/1996 |
| EP | 763903 | | 3/1997 |
| EP | 765042 | | 3/1997 |
| EP | 0853443 | | 7/1998 |
| JP | 01318500 | | 12/1989 |
| WO | WO-8404195 | | 10/1984 |
| WO | WO-8701851 | | 3/1987 |
| WO | WO-9103042 | | 3/1991 |
| WO | WO-9422372 | | 3/1994 |
| WO | WO-9425958 | | 11/1994 |
| WO | WO-9513685 | | 5/1995 |
| WO | WO-9515712 | | 6/1995 |
| WO | WO-9602097 | | 1/1996 |
| WO | WO-8601671 | | 3/1996 |
| WO | WO-9637086 | | 11/1996 |
| WO | WO-96/41498 | | 12/1996 |
| WO | WO-9641498 | | 12/1996 |
| WO | WO-9714266 | | 4/1997 |
| WO | WO-9714267 | | 4/1997 |
| WO | WO-9717819 | A1 | 5/1997 |
| WO | WO-9719573 | | 5/1997 |
| WO | WO-9723062 | | 6/1997 |
| WO | WO-9727682 | | 6/1997 |
| WO | WO-98/51124 | | 11/1998 |
| WO | WO-98/54928 | | 12/1998 |
| WO | WO-00/16590 | | 3/2000 |

OTHER PUBLICATIONS

"Internet Web Page at http://pw2.netcom.com/~ed13/pcmcia.html", entitled "What is PCMCIA", (Nov. 14, 1996),3 pgs.
Anderson, Blane A., "A PCMCIA Card for Programmable Instrument Applications", *TECH-TOPIC, reprinted from The Hearing Review*, vol. 4, No. 9, (Sep. 1997), 47-48.
Armitage, Scott, et al., "Microcard: A new hearing aid programming interface", *Hearing Journal*, 51(9), (Sep. 1998), 37-32.
Bye, Gordon J., et al., "Portable Hearing-Related Analysis System", U.S. Appl. No. 10/698,333, filed Oct. 31, 2003, 90 pgs.
Clancy, David A., "Highlighting developments in hearing aids", *Hearing Instruments*, (Dec. 1995),2.
Eaton, Anthony M., et al., "Hearing Aid Systems", U.S. Appl. No. 09/492,913, filed Jan. 20, 2000, 56 pgs.
Griffing, Terry S., et al., "Acoustical Efficiency of Canal ITE Aids", *Audecibel*, (Spring 1983),30-31.
Griffing, Terry S., et al., "Custom canal and mini in-the-ear hearing aids", *Hearing Instruments, vol. 34, No. 2*, (Feb. 1983), 31-32.
Griffing, Terry S., et al., "How to evaluate, sell, fit and modify canal aids", *Hearing Instruments*, vol. 35, No. 2, (Feb. 1984), 3.
Hagen, Lawrence T., "Portable System for Programming Hearing Aids", U.S. Appl. No. 10/842,246, filed May 10, 2004, 53 pgs.
Mahon, William J., "Hearing Aids Get a Presidential Endorsement", *The Hearing Journal*, (Oct. 1983), 7-8.
Sullivan, Roy F., "Custom canal and concha hearing instruments: A real ear comparison", *Hearing Instruments*, 40(4), (Jul. 1989), 5.
Sullivan, Roy F., "Custom canal and concha hearing instruments: A real ear comparison Part II", *Hearing Instruments*, vol. 40, No. 7, (Jul. 1989), 6.
U.S. Appl. No. 08/896,484 filed Jun. 28, 2001 to Non Final Office Action mailed Feb. 28, 2001, 13 pgs.
U.S. Appl. No. 08/896,484 Final Office Action mailed Sep. 10, 2001, 14 pgs.
U.S. Appl. No. 08/896,484 Response filed Nov. 08, 2001 to Final Office Action mailed Sep. 10, 2001, 12 pgs.
U.S. Appl. No. 08/896,484 Advisory Action mailed Jan. 29, 2002, 3 pgs.
U.S. Appl. No. 08/896,484, Notice of Allowance mailed Mar. 26, 2002, 4 pgs.
U.S. Appl. No. 09/492,913, non-final office action mailed Jun. 2, 2004, 15 pgs.
U.S. Appl. No. 09/492,913 Response filed Nov. 2, 2004 non-final office action mailed Jun. 2, 2004, 24 pgs.
U.S. Appl. No. 09/492,913, final office action mailed Apr. 20, 2005, 21 pgs.
U.S. Appl. No. 09/492913, non-final office action mailed Oct. 10, 2005, 21 pgs.
U.S. Appl. No. 09/492,913, Response filed Feb. 27, 2006 non-final office action mailed Oct. 26, 2005, 26 pgs.
U.S. Appl. No. 09/492,913, final office action mailed Jun. 2, 2006, 24 pgs.
U.S. Appl. No. 09/492,913, non-final office action mailed Jul. 13, 2007, 20 pgs.
U.S. Appl. No. 09/004,788, Non Final Office Action mailed Mar. 23, 2001, 8 pgs.
U.S. Appl. No. 09/004,788, Response filed Jun. 25, 2001 to Non Final Office Action mailed Mar. 23, 2001, 7 pgs.
U.S. Appl. No. 09/004,788, Notice of Allowance mailed Oct. 2, 2001, 7 pgs.
U.S. Appl. No. 09/152,416, Non Final Office Action mailed May 2, 2000, 8 pgs.
U.S. Appl. No. 09/152,416, Response filed Oct. 2, 2000 to Non Final Office Action mailed May 2, 2000, 7 pgs.
U.S. Appl. No. 09/152,416, Non Final Office Action mailed Nov. 3, 2000, 8 pgs.
U.S. Appl. No. 09/152,416, Response filed Feb. 5, 2001, to Non Final Office Action mailed Nov. 3, 2000, 5 pgs.
U.S. Appl. No. 09/152,416, Final Office Action mailed Apr. 23, 2001, 7 pgs.
U.S. Appl. No. 09/152,416, Response filed Sep. 24, 2001 to Final Office Action mailed Apr. 23, 2001, 2 pgs.
U.S. Appl. No. 09/152,416, Notice of Allowance mailed Oct. 19, 2001, 6 pgs.
U.S. Appl. No. 09/152,416, Notice of Allowance mailed Apr. 8, 2002, 5 pgs.
U.S. Appl. No. 09/795,829, Non Final Office Action mailed Jun. 28, 2001, 9 pgs.
U.S. Appl. No. 09/795,829, Response filed Sep. 28, 2001 to Non Final Office Action mailed Jun. 28, 2001, 6 pgs.
U.S. Appl. No. 09/795,829, Non Final Office Action mailed Dec. 11, 2001, 9 pgs.
U.S. Appl. No. 09/795,829, Response filed Jun. 11, 2002 to Non Final Office Action mailed Dec. 11, 2001, 10 pgs.
U.S. Appl. No. 09/795,829, Final Office Action mailed Aug. 9, 2002, 7 pgs.
U.S. Appl. No. 09/795,829, Response filed Nov. 12, 2002 to Final Office Action mailed Aug. 9, 2002, 5 pgs.
U.S. Appl. No. 09/795,829, Non Final Office Action mailed Dec. 23, 2002, 10 pgs.
U.S. Appl. No. 09/795,829, Response filed Mar. 24, 2003 to Non Final Office Action mailed Dec. 23, 2002, 15 pgs.
U.S. Appl. No. 09/795,829, Non Final Office Action mailed Jun. 11, 2003, 12 pgs.
U.S. Appl. No. 09/795,829, Response filed Oct. 14, 2003 to Non Final Office Action mailed Jun. 11, 2003, 14 pgs.
U.S. Appl. No. 09/795,829, Notice of Allowance mailed Nov. 14, 2003, 6 pgs.
U.S. Appl. No. 09/795,829, Notice of Allowance mailed Jan. 21, 2004, 8 pgs.
U.S. Appl. No. 09/795,829, Notice of Allowance mailed Jun. 24, 2004, 5 pgs.

U.S. Appl. No. 09/795,829, Notice of Allowance mailed Nov. 21, 2005, 8 pgs.
U.S. Appl. No. 10/096,335, Non Final Office Action mailed Oct. 3, 2002, 14 pgs.
U.S. Appl. No. 10/096,335, Response filed Apr. 3, 2003 to Non Final Office Action mailed Oct. 3, 2002, 14 pgs.
U.S. Appl. No. 10/096,335, Final Office Action mailed Jul. 15, 2003, 12 pgs.
U.S. Appl. No. 10/096,335, Response filed Jan. 14, 2004 to Final Office Action mailed Jul. 15, 2003, 14 pgs.
U.S. Appl. No. 10/096,335, Non Final Office Action mailed Feb. 11, 2004, 7 pgs.
U.S. Appl. No. 10/096,335, Response filed Jun. 10, 2004 to Non Final Office Action mailed Feb. 11, 2004, 11 pgs.
U.S. Appl. No. 10/096,335, Notice of allowance mailed Nov. 18, 2004, 16 pgs.
U.S. Appl. No. 10/112,965, Non Final Office Action mailed Sep. 23, 2002, 11 pgs.
U.S. Appl. No. 10/112,965, Response filed Nov. 19, 2002 to Non Final Office Action mailed Sep. 23, 2002, 6 pgs.
U.S. Appl. No. 10/112,965, Final Office Action mailed Jan. 27, 2003, 11 pgs.
U.S. Appl. No. 10/112,965, Response filed Mar. 27, 2003 to Final Office Action mailed Jan. 27, 2003, 7 pgs.
U.S. Appl. No. 10/112,965, Advisory Action mailed Apr. 17, 2003, 2 pgs.
U.S. Appl. No. 10/112,965, Notice of Allowance mailed Jun. 6, 2003, 5 pgs.
U.S. Appl. No. 10/241,764, Non Final Office Action mailed Jan. 15, 2003, 12 pgs.
U.S. Appl. No. 10/241,764, Response filed Apr. 14, 2003 to Non Final Office Action mailed Jan. 15, 2003, 13 pgs.
U.S. Appl. No. 10/241,764, Final Office Action mailed Jun. 11, 2003, 9 pgs.
U.S. Appl. No. 10/241,764, Response filed Sep. 11, 2003 to Final Office Action mailed Jun. 11, 2003, 5 pgs.
U.S. Appl. No. 10/241,764, Non Final Office Action mailed Jan. 8, 2004, 9 pgs.
U.S. Appl. No. 10/241,764, Response filed Jun. 8, 2004, to Non Final Office Action mailed Jan. 8, 2004, 11 pgs.
U.S. Appl. No. 10/241,764, Notice of allowance mailed Sep. 29, 2004, 16 pgs.
U.S. Appl. No. 10/698,333, Non Final Office Action mailed Aug. 3, 2004, 12 pgs.
U.S. Appl. No. 10/698,333, Response filed Nov. 03, 2004 to Non Final Office Action mailed Aug. 3, 2004, 9 pgs.
U.S. Appl. No. 10/698,333, Notice of Allowance mailed Dec. 8, 2004, 20 pgs.
U.S. Appl. No. 11/087,081, Non Final Office Action mailed Mar. 15, 2006, 6 pgs.

* cited by examiner

PORTABLE SYSTEM FOR PROGRAMMING HEARING AIDS

CROSS-REFERENCE TO CO-PENDING APPLICATION

This application is a continuation of U.S. application Ser. No. 10/096,335, filed on Mar. 11, 2002, now issued as U.S. Pat. No. 6,888,948, which is a continuation of U.S. application Ser. No. 08/896,484, filed Jul. 18, 1997, now issued as U.S. Pat. No. 6,424,722, which is a continuation-in-part of application Ser. No. 08/782,328, filed on Jan. 13, 1997, now abandoned, all of which are incorporated by reference.

BACKGROUND OF THE INVENTION

1. Field of the Invention

This invention relates generally to a programming system for programmable hearing aids; and, more particularly relates to a portable hearing aid programming system utilizing a portable host computer in conjunction with a plug-in programming Card that is powered by the host computer and operates with a well-defined port to the host to download programs to a portable multiprogram unit for transmitting selected programs to programmable hearing aids.

2. Description of the Prior Art

Hearing aids have been developed to ameliorate the effects of hearing losses in individuals. Hearing deficiencies can range from deafness to hearing losses where the individual has impairment of responding to different frequencies of sound or to being able to differentiate sounds occurring simultaneously. The hearing aid in its most elementary form usually provides for auditory correction through the amplification and filtering of sound provided in the environment with the intent that the individual can hear better than without the amplification.

Prior art hearing aids offering adjustable operational parameters to optimize hearing and comfort to the user have been developed. Parameters, such as volume or tone, may easily be adjusted, and many hearing aids allow for the individual user to adjust these parameters. It is usual that an individual's hearing loss is not uniform over the entire frequency spectrum of audible sound. An individual's hearing loss may be greater at higher frequency ranges than at lower frequencies. Recognizing these differentiations in hearing loss considerations between individuals, it has become common for a hearing health professional to make measurements that will indicate the type of correction or assistance that will be the most beneficial to improve that individual's hearing capability. A variety of measurements may be taken, which can include establishing speech recognition scores, or measurement of the individual's perceptive ability for differing sound frequencies and differing sound amplitudes. The resulting score data or amplitude/frequency response can be provided in tabular form or graphically represented, such that the individual's hearing loss may be compared to what would be considered a more normal hearing response. To assist in improving the hearing of individuals, it has been found desirable to provide adjustable hearing aids wherein filtering parameters may be adjusted, and automatic gain control (AGC) parameters are adjustable.

With the development of micro-electronics and microprocessors, programmable hearing aids have become well-known. It is known for programmable hearing aids to have a digital control section which stores auditory parameters and which controls aspects of signal processing characteristics. Such programmable hearing aids also have a signal processing section, which may be analog or digital, and which operates under control of the control section to perform the signal processing or amplification to meet the needs of the individual.

Hearing aid programming systems have characteristically fallen into two categories: (a) programming systems that are utilized at the manufacturer's plant or distribution center, or (b) programming systems that are utilized at the point of dispensing the hearing aid.

One type of programming system for programming hearing aids are the stand-alone programmers that are self-contained and are designed to provide the designed programming capabilities. Examples of the stand-alone programmers are the Sigma 4000, available commercially from Unitron of Kitchenor, Ontario, Canada, and the Solo II available commercially from dbc-mifco of Portsmouth, N.H. It is apparent that stand-alone programmers are custom designed to provide the programming functions known at the time. Stand-alone programmers tend to be inflexible and difficult to update and modify, thereby raising the cost to stay current. Further, such stand-alone programmers are normally designed for handling a limited number of hearing aid types and lack versatility. Should there be an error in the system that provides the programming, such stand-alone systems tend to be difficult to repair or upgrade.

Another type of programming system is one in which the programmer is connected to other computing equipment. An example of cable interconnection programming systems is the Hi Pro, available from Madsen of Copenhagen, Denmark. A system where multiple programming units are connected via telephone lines to a central computer is described in U.S. Pat. No. 5,226,086 to J. C. Platt. Another example of a programming system that allows interchangeable programming systems driven by a personal computer is described in U.S. Pat. No. 5,144,674 to W. Meyer et al. Other U.S. patents that suggest the use of some form of computing device coupled to an external hearing aid programming device are U.S. Pat. No. 4,425,481 to Mansgold et al.; U.S. Pat. No. 5,226,086 to Platt; U.S. Pat. No. 5,083,312 to Newton et al.; and U.S. Pat. No. 4,947,432 to Tøtholm. Programming systems that are cable-coupled or otherwise coupled to supporting computing equipment tend to be relatively expensive in that such programming equipment must have its own power supply, power cord, housing, and circuitry, thereby making the hearing aid programmer large and not as readily transportable as is desirable.

Yet another type of hearing aid programmer available in the prior art is a programmer that is designed to install into and become part of a larger computing system. An example of such a plug-in system is available commercially and is known as the UX Solo available from dbc-mifco. Hearing aid programmers of the type that plug into larger computers are generally designed to be compatible with the expansion ports on a specific computer. Past systems have generally been designed to plug into the bus structure known as the Industry Standard Architecture (ISA) which has primarily found application in computers available from IBM. The ISA expansion bus is not available on many present-day hand-held or lap top computers. Further, plugging cards into available ISA expansion ports requires opening the computer cabinet and appropriately installing the expansion card.

It can be seen then that the prior art systems do not readily provide for a hearing aid programming system that can be easily affixed to a personal computer such as a lap top computer or a hand-held computer for rendering the entire programming system easily operable and easily transportable. Further, the prior art systems tend to be relatively more expensive, and are not designed to allow modification or enhancement of the software while maintaining the simplicity of operation.

In addition, the prior art does not provide a portable hearing aid programmer that is dynamically reprogrammable from a hand-held computer through a PCMCIA port, and can be used by the hearing aid user to adjust hearing aid parameters for changing ambient sound conditions.

SUMMARY OF THE INVENTION

The primary objective of the invention in providing a small, highly transportable, inexpensive, and versatile system for programming hearing aids is accomplished through the use of host computer means for providing at least one hearing aid program, where the host computer means includes at least one uniformly specified expansion port for providing power circuits, data circuits, and control circuits, and a pluggable card means coupled to the specified port for interacting with the host computer means for controlling programming of at least one hearing aid, the programming system including coupling means for coupling the card means to at least one hearing aid to be programmed.

Another primary objective of the invention is to utilize a standardized specification defining the port architecture for the host computer, wherein the hearing aid programming system can utilize any host computer that incorporates the standardized port architecture. In this regard, the personal computer memory card international association (PCMCIA) specification for the port technology allows the host computer to be selected from lap top computers, notebook computers, or hand-held computers where such PCMCIA ports are available and supported. With the present invention, it is no longer needed to provide general purpose computers, either at the location of the hearing health professional, or at the factory or distribution center of the manufacturer of the hearing aids to support the programming function.

Another objective of the invention is to provide a highly portable system for programming hearing aids to thereby allow ease of usage by hearing health professionals at the point of distribution of hearing aids to individuals requiring hearing aid support. To this end, the programming circuitry is fabricated on a Card that is pluggable to a PCMCIA socket in the host computer and is operable from the power supplied by the host computer.

Yet another object of the invention is to provide an improved hearing aid programming system that utilizes standardized drivers within the host computer. In this aspect of the invention, the PCMCIA card means includes a card information structure (CIS) that identifies the host computer of the identification and configuration requirements of the programming circuits on the card. In one embodiment, the CIS identifies the PCMCIA Card as a serial port such that standardized serial port drivers in the host computer can service the PCMCIA Card. In another embodiment, the CIS identifies the PCMCIA Card as a unique type of hearing aid programmer card such that the host computer would utilize drivers supplied specifically for use with that card. In another embodiment, the CIS identifies the PCMCIA Card as a memory card, thereby indicating to the host computer that the memory card drivers will be utilized. Through the use of the standardized PCMCIA architecture and drivers, the PCMCIA Card can be utilized with any host computer that is adapted to support the PCMCIA architecture.

Still another object of the invention is to provide a hearing aid programming system that can be readily programmed and in which the adjustment programs can be easily modified to correct errors. In one aspect of the invention, the programming software is stored in the memory of a host computer and is available for ease of modification or debugging on the host computer. In operation, then, the programming software is downloaded to the PCMCIA Card when the Card is inserted in the host computer. In another embodiment, the programming software is stored on the PCMCIA Card in nonvolatile storage and is immediately available without downloading upon insertion of the Card. In this latter configuration and embodiment, the nonvolatile storage means can be selected from various programmable devices that may be alterable by the host computer. In one arrangement, the nonvolatile storage device is electrically erasable programmable read-only memory (EEPROM).

Another objective of the invention is to provide an improved hearing aid programming system wherein the hearing aid programming circuitry is mounted on a Card that meets the physical design specifications provided by PCMCIA. To this end, the Card is fabricated to the specifications of either a Type I Card, a Type II Card, or a Type III Card depending upon the physical size constraints of the components utilized.

Yet another objective of the invention is to provide an improved hearing aid programming system wherein the type of hearing aid being programmed can be identified. In this embodiment, a coupling means for coupling the hearing aid programming circuitry to the hearing aid or hearing aids being programmed includes cable means for determining the type of hearing aid being programmed and for providing hearing aid identification signals to the host computer.

A further objective of the invention is to provide an improved hearing aid programming system that allows a portable multiprogram unit to be programmed from a host computer via a PCMCIA interconnection. One or more selected hearing aid programs are generated and stored in this host computer, and are available to be downloaded through the PCMCIA Card to the multiprogram unit. Once programmed, the portable multiprogram unit can be decoupled from the PCMCIA interface and can be utilized to selectively program the hearing aids of a patient through a wireless transmission. Since multiple programs can be stored in the portable multiprogram unit, differing programs can be available for differing ambient conditions that affect the hearing of the patient. That is, the various hearing parameters can easily be reprogrammed by the patient to accommodate various surrounding conditions.

Still another objective of the invention is to provide an improved portable multiprogram unit that can be dynamically programmed via a PCMCIA interface to a portable host computer such that hearing aid programs for a plurality of different hearing conditions are stored. The portable multiprogram unit can then be utilized through a wireless transmission interface to program digital hearing aids of the patient, and allows the programming of the hearing aids to be changed through selective manipulation of the portable multiprogram unit by the patient.

These and other more detailed and specific objectives and an understanding of the invention will become apparent from a consideration of the following Detailed Description of the preferred embodiment in view of the Drawings.

DETAILED DESCRIPTION OF THE PREFERRED EMBODIMENT

Figure 1:
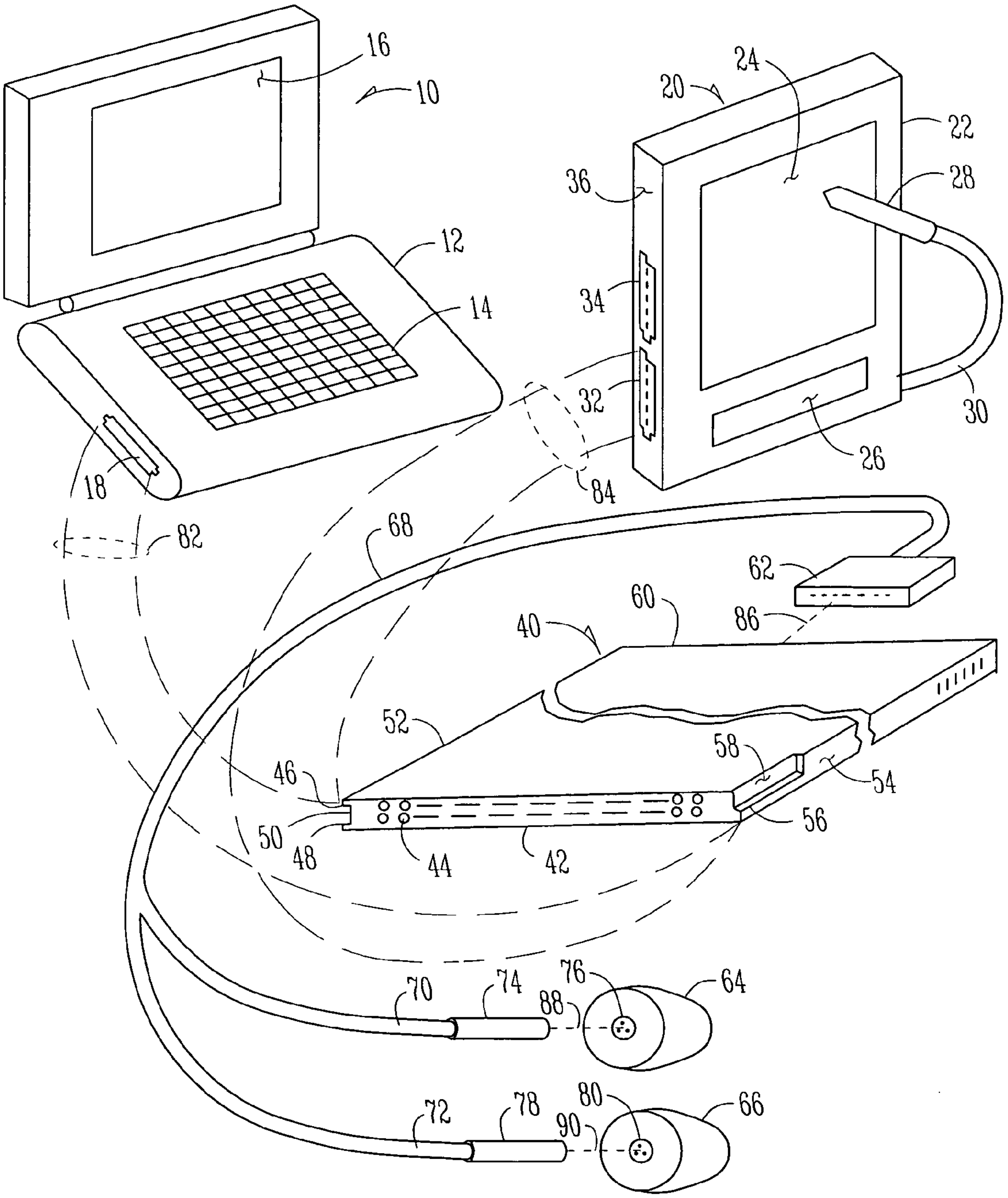
FIG. 1 is a pictorial view of an improved hearing aid programming system of this invention.

It is generally known that a person's hearing loss is not normally uniform over the entire frequency spectrum of hearing. For example, in typical noise-induced hearing loss, that the hearing loss is greater at higher frequencies than at lower frequencies. The degree of hearing loss at various frequencies varies with individuals. The measurement of an individual's hearing ability can be illustrated by an audiogram. An audiologist, or other hearing health professionals, will measure an individual's perceptive ability for differing sound frequencies and differing sound amplitudes. A plot of the resulting information in an amplitude/frequency diagram will graphically represent the individual's hearing ability, and will thereby represent the individual's hearing loss as compared to an established range of normal hearing for individuals. In this regard, the audiogram represents graphically the particular auditory characteristics of the individual. Other types of measurements relating to hearing deficiencies may be made. For example, speech recognition scores can be utilized. It is understood that the auditory characteristics of an individual or other measured hearing responses may be represented by data that can be represented in various tabular forms as well as in the graphical representation.

Basically a hearing aid consists of a sound actuatable microphone for converting environmental sounds into an electrical signal. The electrical signal is supplied to an amplifier for providing an amplified output signal. The amplified output signal is applied to a receiver that acts as a loudspeaker for converting the amplified electrical signal into sound that is transmitted to the individual's ear. The various kinds of hearing aids can be configured to be "completely in the canal" known as the CIC type of hearing aid. Hearing aids can also be embodied in configurations such as "in the ear", "in the canal", "behind the ear", embodied in an eyeglass frame, worn on the body, and surgically implanted. Each of the various types of hearing aids have differing functional and aesthetic characteristics. Further, hearing aids can be programmed through analog parametric adjustments or through digital programs.

Since individuals have differing hearing abilities with respect to each other, and oftentimes have differing hearing abilities between the right and left ears, it is normal to have some form of adjustment to compensate for the characteristics of the hearing of the individual. It has been known to provide an adjustable filter for use in conjunction with the amplifier for modifying the amplifying characteristics of the hearing aid. Various forms of physical adjustment for adjusting variable resistors or capacitors have been used. With the advent of microcircuitry, the ability to program hearing aids has become well-known. A programmable hearing aid typically has a digital control section and a signal processing section. The digital control section is adapted to store an auditory parameter, or a set of auditory parameters, which will control an aspect or set of aspects of the amplifying characteristics, or other characteristics, of the hearing aid. The signal processing section of the hearing aid then will operate in response to the control section to perform the actual signal processing, or amplification, it being understood that the signal processing may be digital or analog.

Numerous types of programmable hearing aids are known. As such, details of the specifics of programming functions will not be described in detail. To accomplish the programming, it has been known to have the manufacturer establish a computer-based programming function at its factory or outlet centers. In this form of operation, the details of the individual's hearing readings, such as the audiogram, are forwarded to the manufacturer for use in making the programming adjustments. Once adjusted, the hearing aid or hearing aids are then sent to the intended user. Such an operation clearly suffers from the disadvantage of the loss of time in the transmission of the information and the return of the adjusted hearing aid, as well as not being able to provide inexpensive and timely adjustments with the individual user. Such arrangements characteristically deal only with the programming of the particular manufacturer's hearing aids, and are not readily adaptable for adjusting or programming various types of hearing aids.

Yet another type of prior art programming system is utilized wherein the programming system is located near the hearing health professional who would like to program the hearing aid for patients. In such an arrangement, it is common for each location to have a general purpose computer especially programmed to perform the programming function and provide it with an interface unit hard-wired to the computer for providing the programming function to the hearing aid. In this arrangement, the hearing professional enters the audiogram or other patient-related hearing information into the computer, and thereby allows the computer to calculate the auditory parameters that will be optimal for the predetermined listening situations for the individual. The computer then directly programs the hearing aid. Such specific programming systems and hard-wired interrelationship to the host computer are costly and do not lend themselves to ease of altering the programming functions.

Other types of programming systems wherein centralized host computers are used to provide programming access via telephone lines and the like are also known, and suffer from many of the problems of cost, lack of ease of usage, lack of flexibility in reprogramming, and the like.

A number of these prior art programmable systems have been identified above, and their respective functionalities will not be further described in detail.

The system and method of programming hearing aids of the present invention provides a mechanism where all of the hearing aid programming system can be economically located at the office of each hearing health professional, thereby overcoming many of the described deficiencies of prior art programming systems.

A group of computing devices, including lap top computers, notebook computers, hand-held computers, such as the APPLE® NEWTON® Message Pad 2000, and the like, which can collectively be referenced as host computers are adapted to support the Personal Computer Memory Card International Association Technology, and which is generally referred to as PCMCIA. In general, PCMCIA provides one or more standardized ports in the host computer where such ports are arranged to cooperate with associated PCMCIA PC cards, hereinafter referred to as "Cards". The Cards are utilized to provide various functions, and the functionality of PCMCIA will be described in more detail below. The PCMCIA specification defines a standard for integrated circuit Cards to be used to promote interchangeability among a variety of computer and electronic products. Attention is given to low cost, ruggedness, low power consumption, light weight, and portability of operation.

The specific size of the various configurations of Cards will be described in more detail below, but in general, it is understood that it will be comparable in size to credit cards, thereby achieving the goal of ease of handling. Other goals of PCMCIA technology can be simply stated to require that (1) it must be simple to configure, and support multiple peripheral devices; (2) it must be hardware and operating environment independent; (3) installation must be flexible; and (4) it must be inexpensive to support the various peripheral devices. These goals and objectives of PCMCIA specification requirements and available technology are consistent with the goals of this invention of providing an improved highly portable, inexpensive, adaptable hearing aid programming system. The PCMCIA technology is expanding into personal computers and work stations, and it is understood that where such capability is present, the attributes of this invention are applicable. Various aspects of PCMCIA will be described below at points to render the description meaningful to the invention.

FIG. 1 is a pictorial view of an improved hearing aid programming system of this invention. A host computer 10, which can be selected from among lap top computers; notebook computers; personal computers; work station computers; or the like, includes a body portion 12, a control keyboard portion 14, and a display portion 16. While only one PCMCIA port 18 is illustrated, it is understood that such ports may occur in pairs. Various types of host computers 10 are available commercially from various manufacturers, including, but not limited to, International Business Machines and Apple Computer, Inc. Another type of host computer is the hand-held computer 20 such as the APPLE® NEWTON® Message Pad 2000, or equivalent. The hand-held host 20 includes a body portion 22, a screen portion 24, a set of controls 26 and a stylus 28. The stylus 28 operates as a means for providing information to the hand-held host computer 20 by interaction with screen 24. A pair of PCMCIA ports 32 and 34 are illustrated aligned along one side 36 of the hand-held host computer 20. Again, it should be understood that more or fewer PCMCIA ports may be utilized. Further, it will be understood that it is possible for the PCMCIA ports to be position in parallel and adjacent to one another as distinguished from the linear position illustrated. A hand-held host computer is available from various sources, such as the Newton model available from Apple Computer, Inc.

A PCMCIA Card 40 has a first end 42 in which a number of contacts 44 are mounted. In the standard, the contacts 44 are arranged in two parallel rows and number sixty-eight contacts. The outer end 60 has a connector (not shown in this figure) to cooperate with mating connector 62. This interconnection provide signals to and from hearing aids 64 and 66 via cable 68 which splits into cable ends 70 and 72. Cable portion 70 has connector 74 affixed thereto and adapted for cooperation with jack 76 in hearing aid 64. Similarly, cable 72 has connector 78 that is adapted for cooperation with jack 80 in hearing aid 66. This configuration allows for programming of hearing aid 64 and 66 in the ears of the individual to use them, it being understood that the cable interconnection may alternatively be a single cable for a single hearing aid or two separate cables with two separations to the Card 40.

It is apparent that card 40 and the various components are not shown in scale with one another, and that the dashed lines represent directions of interconnection. In this regard, a selection can be made between portable host 10 or hand-held host 20. If host 10 is selected, card 40 is moved in the direction of dashed lines 82 for insertion in PCMCIA slot 18. Alternatively, if a hand-held host 20 is to be used, Card 40 is moved along dashed lines 84 for insertion in PCMCIA slot 32. Connector 62 can be moved along dashed line 86 for mating with the connector (not shown) at end 60 of card 40. Connector 74 can be moved along line 88 for contacting jack 76, and connector 78 can be moved along dashed line 90 for contacting jack 80. There are three standardized configurations of Card 40 plus one nonstandard form that will not be described.

Figure 2:
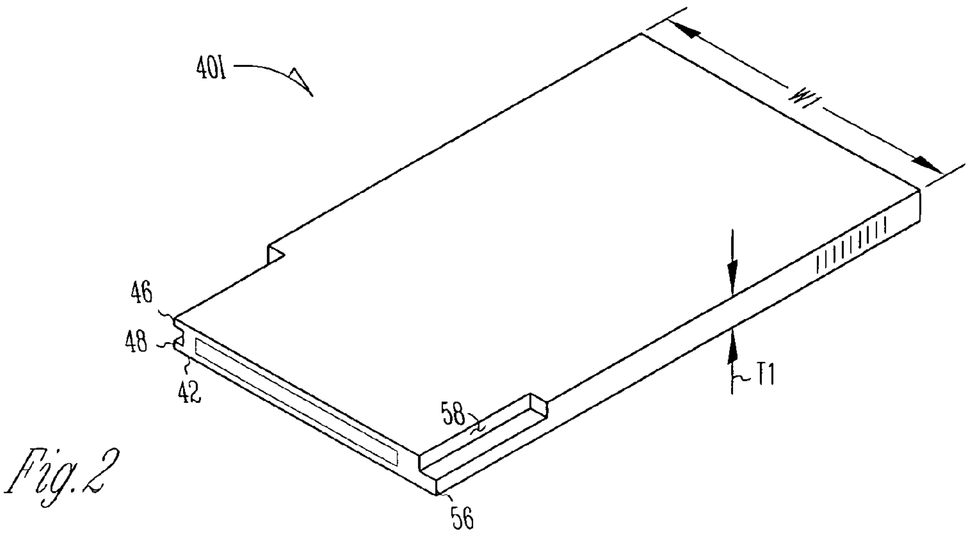
FIG. 2 is a perspective view of a Type I plug-in Card.

FIG. 2 is a perspective view of a Type I plug-in Card. The physical configurations and requirements of the various Card types are specified in the PCMCIA specification to assure portability and consistency of operation. Type I Card 40I has a width W1 of 54 millimeters and a thickness T1 of 3.3 millimeters. Other elements illustrated bear the same reference numerals as in FIG. 1.

Figure 3:
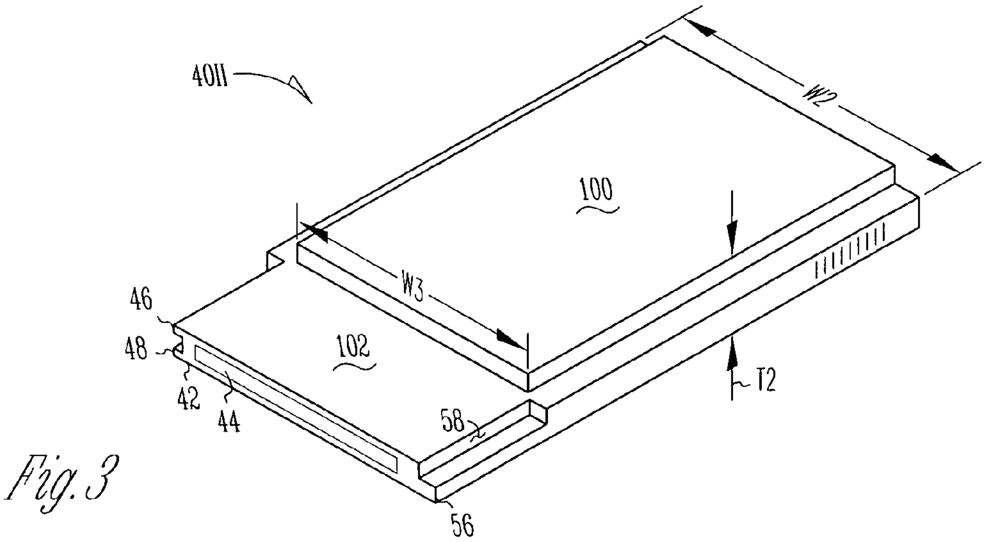
FIG. 3 is a perspective view of a Type II plug-in Card.

FIG. 3 is a perspective view of a Type II plug-in Card. Card 40II has a width W2 of 54 millimeters and has a raised portion 100. With the raised portion, the thickness T2 is 5.0 millimeters. The width W3 of raised portion 100 is 48 millimeters. The purpose of raised portion 100 is to provide room for circuitry to be mounted on the surface 102 of card 40II.

Figure 4:
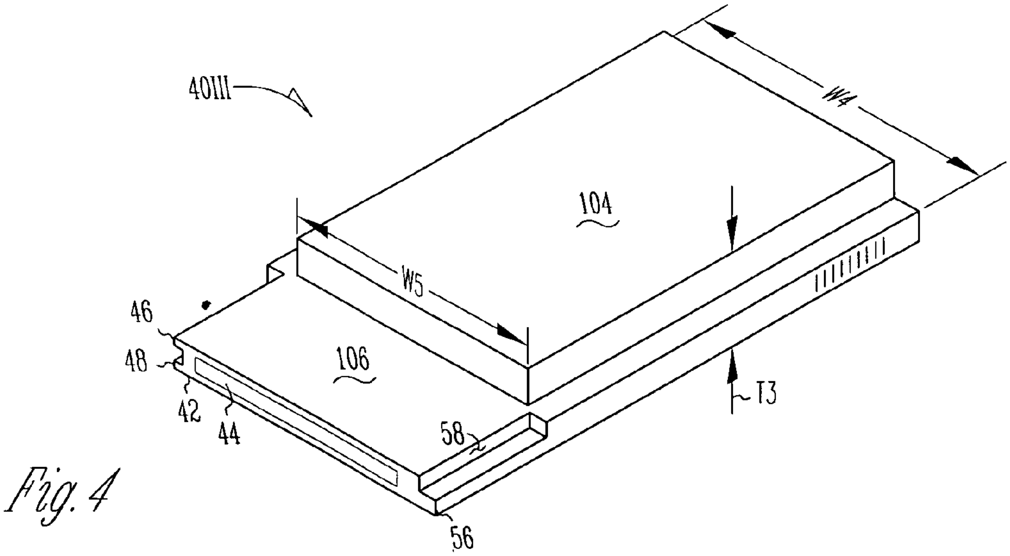
FIG. 4 is a perspective view of a Type III plug-in Card.

FIG. 4 is a perspective view of a Type III plug-in Card. Card 40III has a width W4 of 54 millimeters, and an overall thickness T3 of 10.5 millimeters. Raised portion 104 has a width W5 of 51 millimeters, and with the additional depth above the upper surface 106 allows for even larger components to be mounted.

Type II Cards are the most prevalent in usage, and allow for the most flexibility in use in pairs with stacked PCMCIA ports.

The PCMCIA slot includes two rows of 34 pins each. The connector on the Card is adapted to cooperate with these pins. There are three groupings of pins that vary in length. This results in a sequence of operation as the Card is inserted into the slot. The longest pins make contact first, the intermediate length pins make contact second, and the shortest pins make contact last. The sequencing of pin lengths allow the host system to properly sequence application of power and ground to the Card. It is not necessary for an understanding of the invention to consider the sequencing in detail, it being automatically handled as the Card is inserted. Functionally, the shortest pins are the card detect pins and are responsible for routing signals that inform software running on the host of the insertion or removal of a Card. The shortest pins result in this operation occurring last, and functions only after the Card has been fully inserted. It is not necessary for an understanding of the invention that each pin and its function be considered in detail, it being understood that power and ground is provided from the host to the Card.

Figure 5:
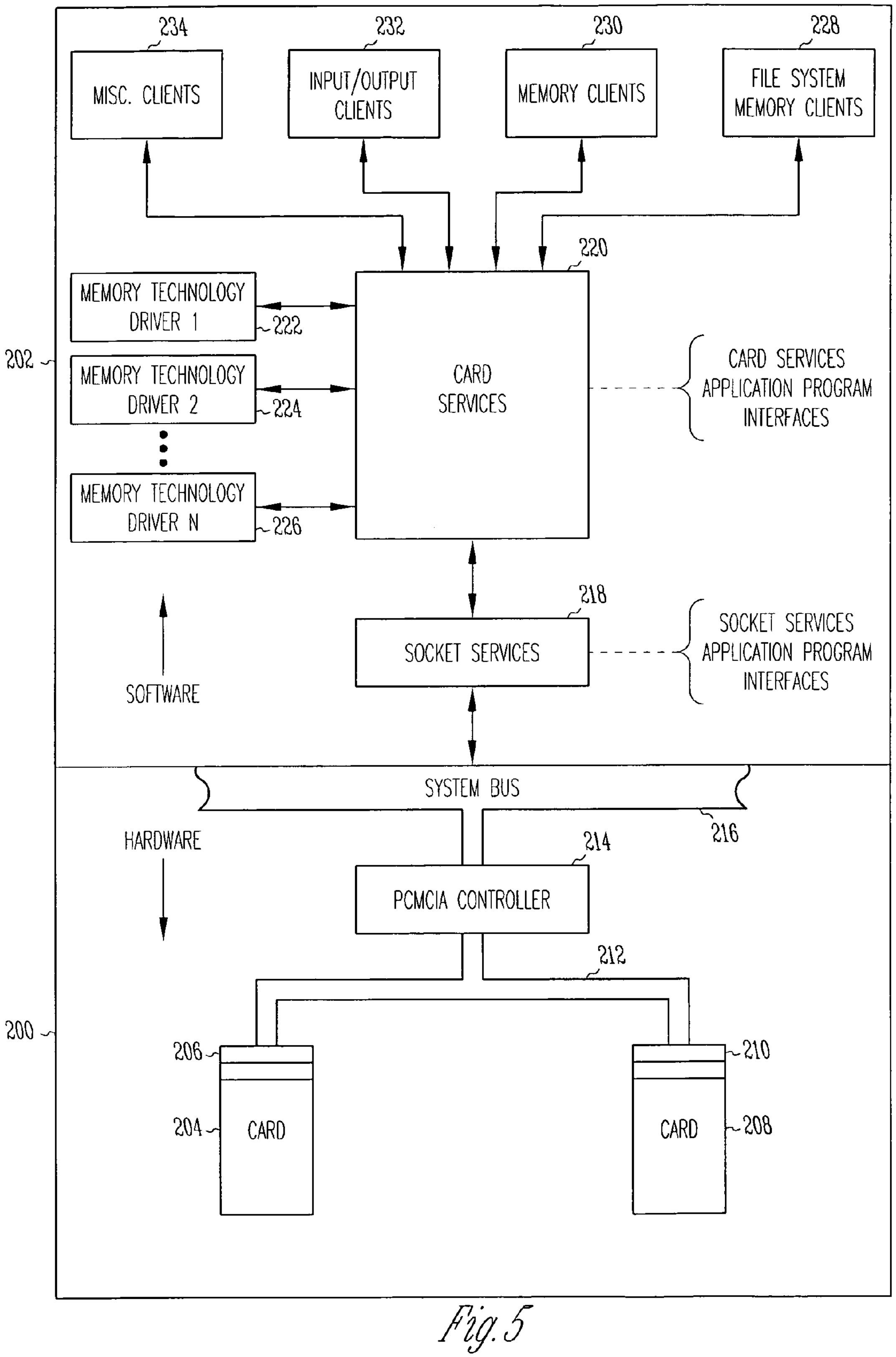
FIG. 5 is a diagram representing the PCMCIA architecture.

FIG. 5 is a diagram representing the PCMCIA architecture. The PCMCIA architecture is well-defined and is substantially available on any host computer that is adapted to support the PCMCIA architecture. For purposes of understanding the invention, it is not necessary that the intricate details of the PCMCIA architecture be defined herein, since they are substantially available in the commercial marketplace. It is, however, desirable to understand some basic fundamentals of the PCMCIA architecture in order to appreciate the operation of the invention.

In general terms, the PCMCIA architecture defines various interfaces and services that allow application software to configure Card resources into the system for use by system-level utilities and applications. The PCMCIA hardware and related PCMCIA handlers within the system function as enabling technologies for the Card.

Resources that are capable of being configured or mapped from the PCMCIA bus to the system bus are memory configurations, input/output (I/O) ranges and Interrupt Request Lines (IRQs). Details concerning the PCMCIA architecture can be derived from the specification available from PCMCIA Committee, as well as various vendors that supply PCMCIA components or software commercially.

The PCMCIA architecture involves a consideration of hardware 200 and layers of software 202. Within the hardware consideration, Card 204 is coupled to PCMCIA socket 206 and Card 208 is coupled to PCMCIA socket 210. Sockets 206 and 210 are coupled to the PCMCIA bus 212 which in turn is coupled to the PCMCIA controller 214. Controllers are provided commercially by a number of vendors. The controller 214 is programmed to carry out the functions of the PCMCIA architecture, and responds to internal and external stimuli. Controller 214 is coupled to the system bus 216. The system bus 216 is a set of electrical paths within a host computer over which control signals, address signals, and data signals are transmitted. The control signals are the basis for the protocol established to place data signals on the bus and to read data signals from the bus. The address lines are controlled by various devices that are connected to the bus and arc utilized to refer to particular memory locations or I/O locations. The data lines are used to pass actual data signals between devices.

The PCMCIA bus 212 utilizes 26 address lines and 16 data lines.

Within the software 202 consideration, there are levels of software abstractions. The Socket Services 218 is the first level in the software architecture and is responsible for software abstraction of the PCMCIA sockets 206 and 210. In general, Socket Services 218 will be applicable to a particular controller 214. In general, Socket Services 218 uses a register set (not shown) to pass arguments and return status. When interrupts are processed with proper register settings, Socket Services gains control and attempts to perform functions specified at the Application Program Interfaces (API).

Card Services 220 is the next level of abstraction defined by PCMCIA and provides for PCMCIA system initialization, central resource management for PCMCIA, and APIs for Card configuration and client management. Card Services is event-driven and notifies clients of hardware events and responds to client requests. Card Services 220 is also the manager of resources available to PCMCIA clients and is responsible for managing data and assignment of resources to a Card. Card Services assigns particular resources to Cards on the condition that the Card Information Structure (CIS) indicates that they are supported. Once resources are configured to a Card, the Card can be accessed as if it were a device in the system. Card Services has an array of Application Program Interfaces to provide the various required functions.

Memory Technology Driver 1 (MTD) 222, Memory Technology Driver 2, label 224, and Memory Technology Driver N, label 226, are handlers directly responsible for reading and writing of specific memory technology memory Cards. These include standard drivers and specially designed drivers if required.

Card Services 220 has a variety of clients such as File System Memory clients 228 that deal with file system aware structures; Memory Clients 230, Input/Output Clients 232; and Miscellaneous Clients 234.

Figure 6:
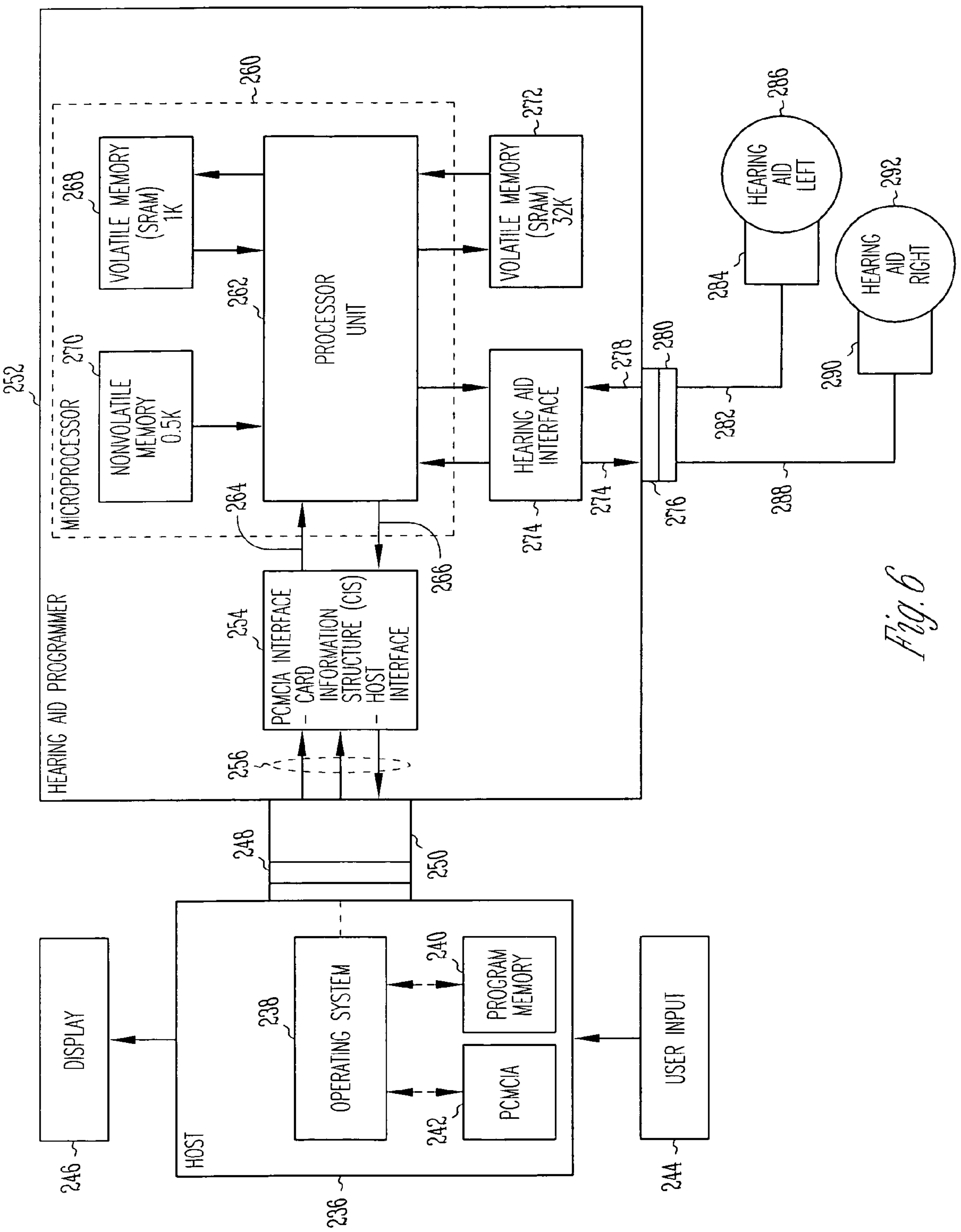
FIG. 6 is a block diagram illustrating the functional interrelationship of a host computer and the Card used for programming hearing aids.

FIG. 6 is a block diagram illustrating the functional interrelationship of a host computer and a Card used for programming hearing aids. A Host 236 has an Operating System 238. A Program Memory 240 is available for storing the hearing aid programming software. The PCMCIA block 242 indicates that the Host 236 supports the PCMCIA architecture. A User Input 244 provides input control to Host 236 for selecting hearing aid programming functions and providing data input to Host 236. A Display 246 provides output representations for visual observation. PCMCIA socket 248 cooperates with PCMCIA jack 250 mounted on Card 252.

On Card 252 there is a PCMCIA Interface 254 that is coupled to jack 250 via lines 256, where lines 256 include circuits for providing power and ground connections from Host 236, and circuits for providing address signals, data signals, and control signals. The PCMCIA Interface 254 includes the Card Information Structure (CIS) that is utilized for providing signals to Host 236 indicative of the nature of the Card and setting configuration parameters. The CIS contains information and data specific to the Card, and the components of information in CIS is comprised of tuples, where each tuple is a segment of data structure that describes a specific aspect or configuration relative to the Card. It is this information that will determine whether the Card is to be treated as a standard serial data port, a standard memory card, a unique programming card or the like. The combination of tuples is a metaformat.

A Microprocessor shown within dashed block 260 includes a Processor Unit 262 that receives signals from PCMCIA Interface 254 over lines 264 and provides signals to the Interface over lines 266. An onboard memory system 268 is provided for use in storing program instructions. In the embodiment of the circuit, the Memory 268 is a volatile static random access memory (SRAM) unit of 1K capacity. A Nonvolatile Memory 370 is provided. The Nonvolatile Memory is 0.5K and is utilized to store initialization instructions that are activated upon insertion of Card 352 into socket 348. This initialization software is often referred to as "boot-strap" software in that the system is capable of pulling itself up into operation.

A second Memory System 272 is provided. This Memory is coupled to Processor Unit 262 for storage of hearing aid programming software during the hearing aid programming operation. In a preferred embodiment, Memory 272 is a volatile SRAM having a 32K capacity. During the initialization phases, the programming software will be transmitted from the Program Memory 240 of Host 236 and downloaded through the PCMCIA interface 254. In an alternative embodiment, Memory System 272 can be a nonvolatile memory with the hearing aid programming software stored therein. Such nonvolatile memory can be selected from available memory systems such as Read Only Memory (ROM), Programmable Read Only Memory (PROM), Erasable Programmable Read Only Memory (EPROM), or Electrically Erasable Programmable Read Only Memory (EEPROM). It is, of course, understood that Static Random Access Memory (SRAM) memory systems normally do not hold or retain data stored therein when power is removed.

A Hearing Aid Interface 274 provides the selected signals over lines 274 to the interface connector 276. The Interface receives signals on lines 278 from the interface connector. In general, the Hearing Aid Interface 274 functions under control of the Processor Unit 262 to select which hearing aid will be programmed, and to provide the digital to analog selections, and to provide the programmed impedance levels.

A jack 280 couples with connector 276 and provides electrical connection over lines 282 to jack 284 that couples to hearing aid 286. In a similar manner, conductors 288 coupled to jack 290 for making electrical interconnection with hearing aid 292.

Assuming that Socket Services 218, Card Services 220 and appropriate drivers and handlers are appropriately loaded in the Host 236, the hearing aid programming system is initialized by insertion of Card 252 into socket 248. The insertion processing involves application of power signals first since they are connected with the longest pins. The next longest pins cause the data, address and various control signals to be made. Finally, when the card detect pin is connected, there is a Card status change interrupt. Once stabilized, Card Services queries the status of the PCMCIA slot through the Socket Services, and if the state has changed, further processing continues. At this juncture, Card Services notifies the I/O clients which in turn issues direction to Card Services to read the Card's CIS. The CIS tuples are transmitted to Card Services and a determination is made as to the identification of the Card 252 and the configurations specified. Depending upon the combination of tuples, that is, the metaformat, the Card 252 will be identified to the Host 236 as a particular structure. In a preferred embodiment, Card 252 is identified as a serial memory port, thereby allowing Host 236 to treat with data transmissions to and from Card 252 on that basis. It is, of course, understood that Card 252 could be configured as a serial data Card, a Memory Card or a unique programming Card thereby altering the control and communication between Host 236 and Card 252.

Figure 7:
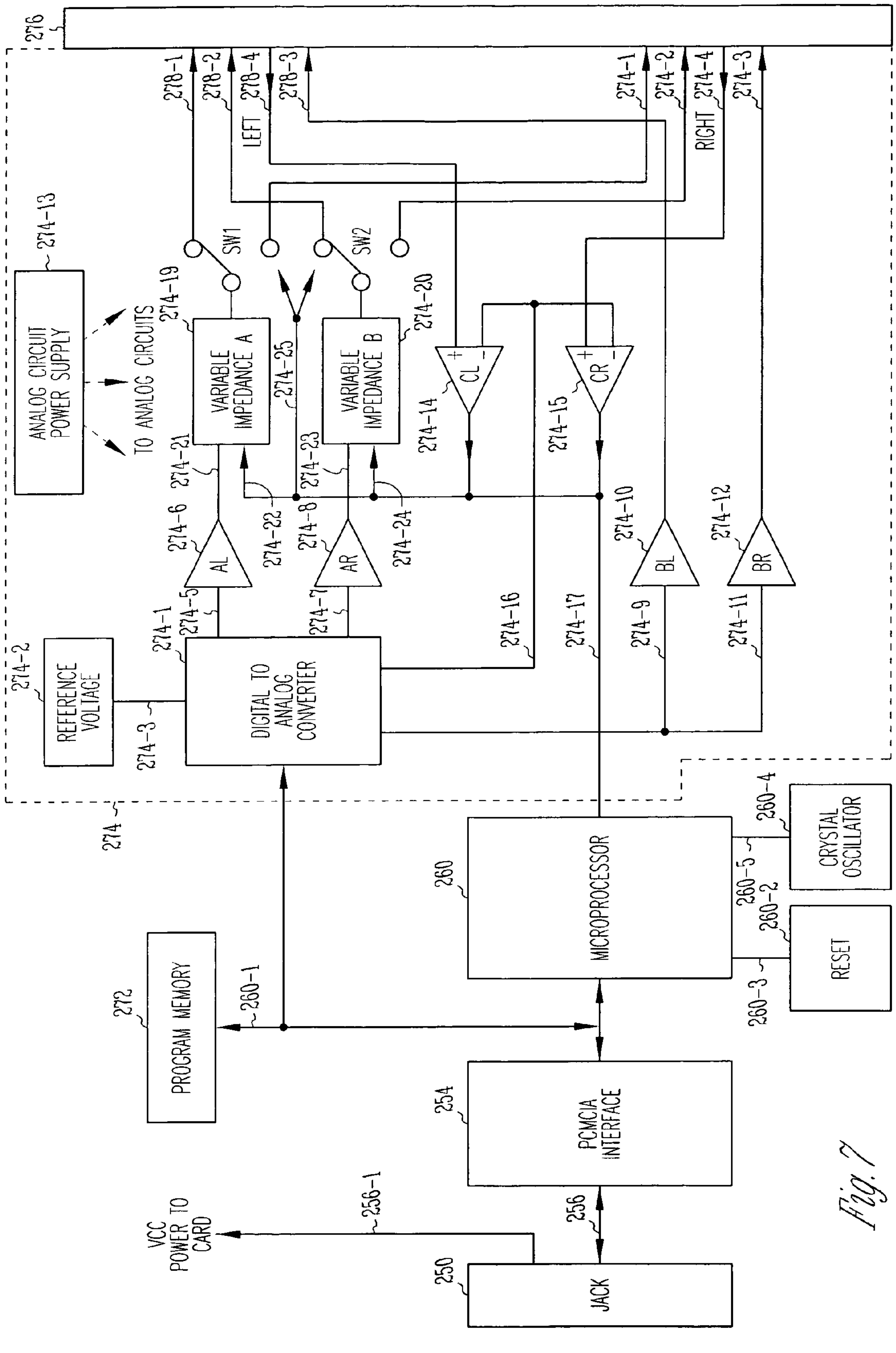
FIG. 7 is a functional block diagram of the hearing aid programming Card.

FIG. 7 is a functional block diagram of the hearing aid programming Card.

The PCMCIA jack 250 is coupled to PCMCIA Interface 254 via PCMCIA bus 256, and provides VCC power to the card via line 256-1. The Microprocessor 260 is coupled to the Program Memory 272 via the Microprocessor Bus 260-1. A Reset Circuit 260-2 is coupled via line 260-3 to Microprocessor 260 and functions to reset the Microprocessor when power falls below predetermined limits. A Crystal Oscillator 260-4 is coupled to Microprocessor 260 via line 260-5 and provides a predetermined operational frequency signal for use by Microprocessor 260.

The Hearing Aid Interface shown enclosed in dashed block 274 includes a Digital to Analog Converter 274-1 that is coupled to a Reference Voltage 274-2 via line 274-3. In a preferred embodiment, the Reference Voltage is established at 2.5 volts DC. Digital to Analog Converter 274-1 is coupled to Microprocessor Bus 260-1. The Digital to Analog Converter functions to produce four analog voltages under control of the programming established by the Microprocessor.

One of the four analog voltages is provided on Line 274-5 to amplifier AL, labeled 274-6, which functions to convert 0 to reference voltage levels to 0 to 15 volt level signals. A second voltage is provided on line 274-7 to amplifier AR, labeled 274-8, which provides a similar conversion of 0 volts to the reference voltage signals to 0 volts to 15 volt signals. A third voltage is provided on line 274-9 to the amplifier BL, labeled 274-10, and on line 274-11 to amplifier BR, labeled 274-12. Amplifiers BL and BR convert 0 volt signals to reference voltage signals to 0 volts to 15 volt signals and are used to supply power to the hearing aid being adjusted. In this regard, amplifier BL provides the voltage signals on line 278-3 to the Left hearing aid, and amplifier BR provides the selected voltage level signals on line 274-3 to the Right hearing aid.

An Analog Circuit Power Supply 274-13 provides predetermined power voltage levels to all analog circuits.

A pair of input Comparators CL labeled 274-14 and CR labeled 274-15 are provided to receive output signals from the respective hearing aids. Comparator CL receives input signals from the Left hearing aid via line 278-4 and Comparator CR receives input signals from the Right hearing aid via line 274-4. The fourth analog voltage from Digital to Analog Converter 274-1 is provided on line 274-16 to Comparators CL and CR.

A plurality of hearing aid programming circuit control lines pass from Microprocessor 260 and to the Microprocessor via lines 274-17. The output signals provided by comparators CL and CR advise Microprocessor 260 of parameters concerning the CL and CR hearing aids respectively.

A Variable Impedance A circuit and Variable Impedance B circuit 274-20 each include a predetermined number of analog switches and a like number of resistance elements. In a preferred embodiment as will be described in more detail below, each of these circuits includes eight analog switches and eight resistors. The output from amplifier AL is provided to Variable Impedance A via line 274-21 and selection signals are provided via line 274-22. The combination of the voltage signal applied and the selection signals results in an output being provided to switch SW1 to provide the selected voltage level. In a similar manner, the output from Amplifier R is provided on line 274-23 to Variable Impedance B 274-20, and with control signals on line 274-24, results in the selected voltage signals being applied to switch SW2.

Switches SW1 and SW2 are analog switches and are essentially single pole double throw switches that are switched under control of signals provided on line 274-25. When the selection is to program the left hearing aid, switch SW1 will be in the position shown and the output signals from Variable Impedance A will be provided on line 278-1 to LF hearing aid. At the same time, the output from Variable Impedance B 274-20 will be provided through switch SW2 to line 278-2. When it is determined that the Right hearing aid is to be programmed, the control signals on line 274-25 will cause switches SW1 and SW2 to switch. This will result in the signal from Variable Impedance A to be provided on line 274-1, and the output from Variable Impedance B to be provided on line 274-2 to the Right hearing aid.

With the circuit elements shown, the program that resides in Program Memory 272 in conjunction with the control of Microprocessor 260 will result in application of data and control signals that will read information from Left and Right hearing aids, and will cause generation of the selection of application and the determination of levels of analog voltage signals that will be applied selectively the Left and Right hearing aids.

In another embodiment of the invention, a Portable Multiprogram Unit (PMU) is adapted to store one or more hearing aid adjusting programs for a patient or user to easily adjust or program hearing aid parameters. The programs reflect adjustments to hearing aid parameters for various ambient hearing conditions. Once the PMU is programmed with the downloaded hearing aid programs, the PMU utilizes a wireless transmission to the user's hearing aid permitting the selective downloading of a selected one of the hearing aid programs to the digitally programmable hearing aids of a user.

Figure 8:
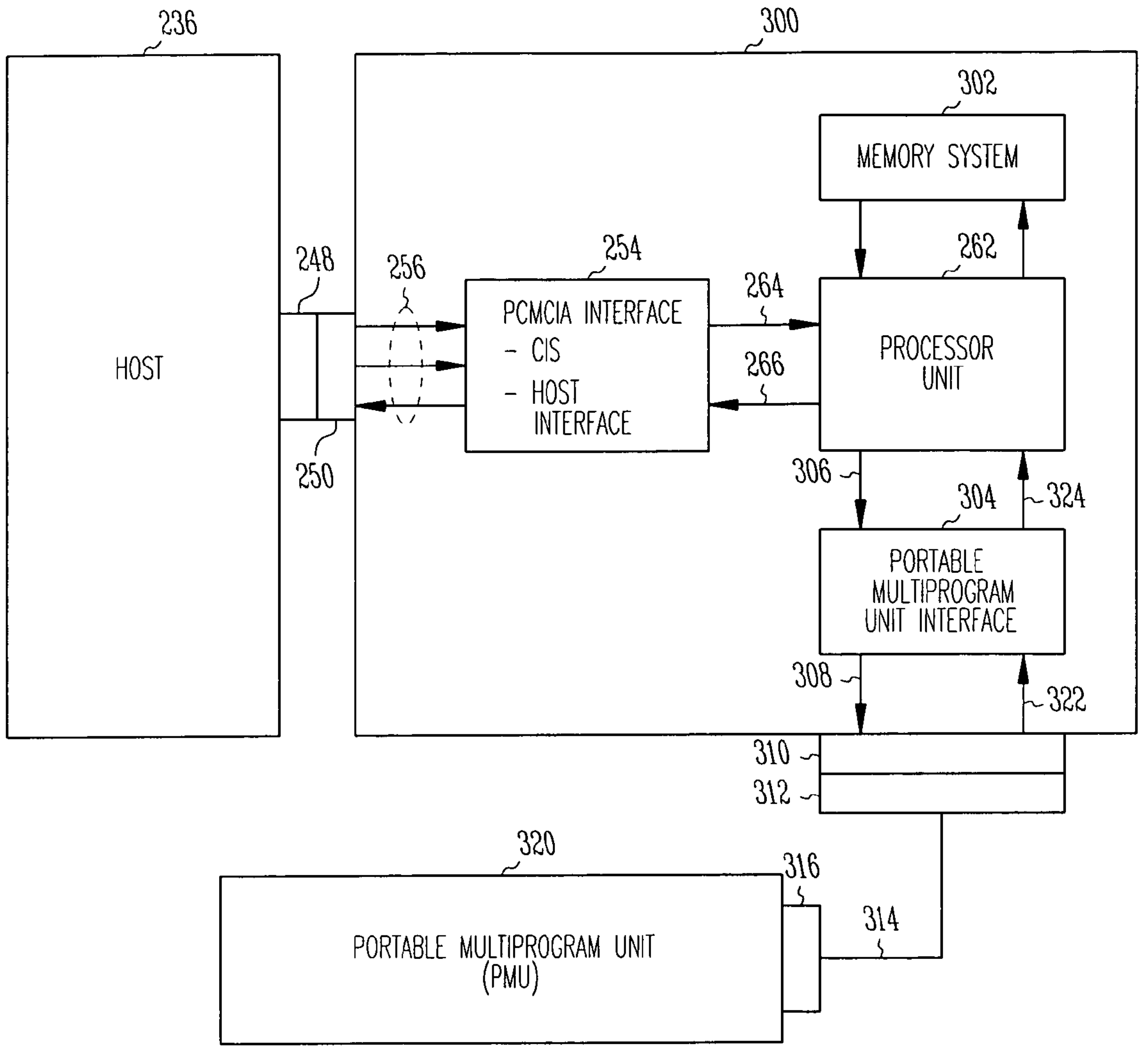
FIG. 8 is a block diagram illustrating the functional relationship of the host computer and the Card used to program a portable multiprogram unit.

FIG. 8 is a block diagram illustrating the functional relationship of the host computer and the Card used to program a portable multiprogram unit. The PCMCIA Card 300 is coupled via connector portions 250 and 248 to Host 236. This PCMCIA interconnection is similar to that described above. The Host 236 stores one or more programs for programming the hearing aids of a patient. The Host can be any portable processor of the type described above, and advantageously can be a Message Pad 2,000 hand-held computer. The hearing aid programmer Card 300 has a PCMCIA Interface 254 that is coupled to host 236 via conductors 256 through the PCMCIA connector interface 248 and 250. A Processor Unit 262 is schematically coupled via conductor paths 264 and 266 to the PCMCIA Interface 254 for bidirectional flow of data and control signals. A Memory System 302 can include nonvolatile memory and volatile memory for the boot-strap and program storage functions described above.

A Portable Multiprogram Unit Interface 304 receives hearing aid programs via line 306 from the Processor Unit 262 and provides the digital hearing aid programs as signals on line 308 to jack 310. Connector 312 mates with jack 310 and provides the hearing aid program signals via cable 314 to removable jack 316 that is coupled to the Portable Multiprogram Unit 320. Control signals are fed from PMU 320 through cable 314 to be passed on line 322 to the Portable Multiprogram Unit Interface 304. These control signals are in turn passed on line 324 to the Processor Unit 262, and are utilized to control downloading of the hearing aid programs. PMUs are available commercially, and will be only functionally described.

This embodiment differs from the embodiment described with regard to FIG. 6 in that there is not direct electrical connection to the hearing aids to be programmed. It should be understood that the portable multiprogram unit interface and its related jack 310 could also be added to the PCMCIA Card illustrated in FIG. 6 and FIG. 7, thereby providing direct and remote portable hearing programming capability on a single Card.

In this embodiment, the functioning of the PCMCIA Interface 254 is similar to that described above. Upon plugging in PCMCIA Card 300, the Host 236 responds to the CIS and its Card identification for the selected hearing aid programming function. At the same time, Processor Unit 262 has power applied and boot-straps the processor operation. When thus activated, the Card 300 is conditioned to receive one or more selected hearing aid programs from the Host. Selection of hearing aid program parameters is accomplished by the operator selection of parameters for various selected conditions to be applied for the particular patient.

The number of programs for a particular patient for the various ambient and environmental hearing conditions can be selected, and in a preferred embodiment, will allow for four distinct programming selections. It is, of course, understood that by adjustment of the amount of storage available in the hearing aids and the PMU, a larger number of programs could be stored for portable application.

Figure 9:
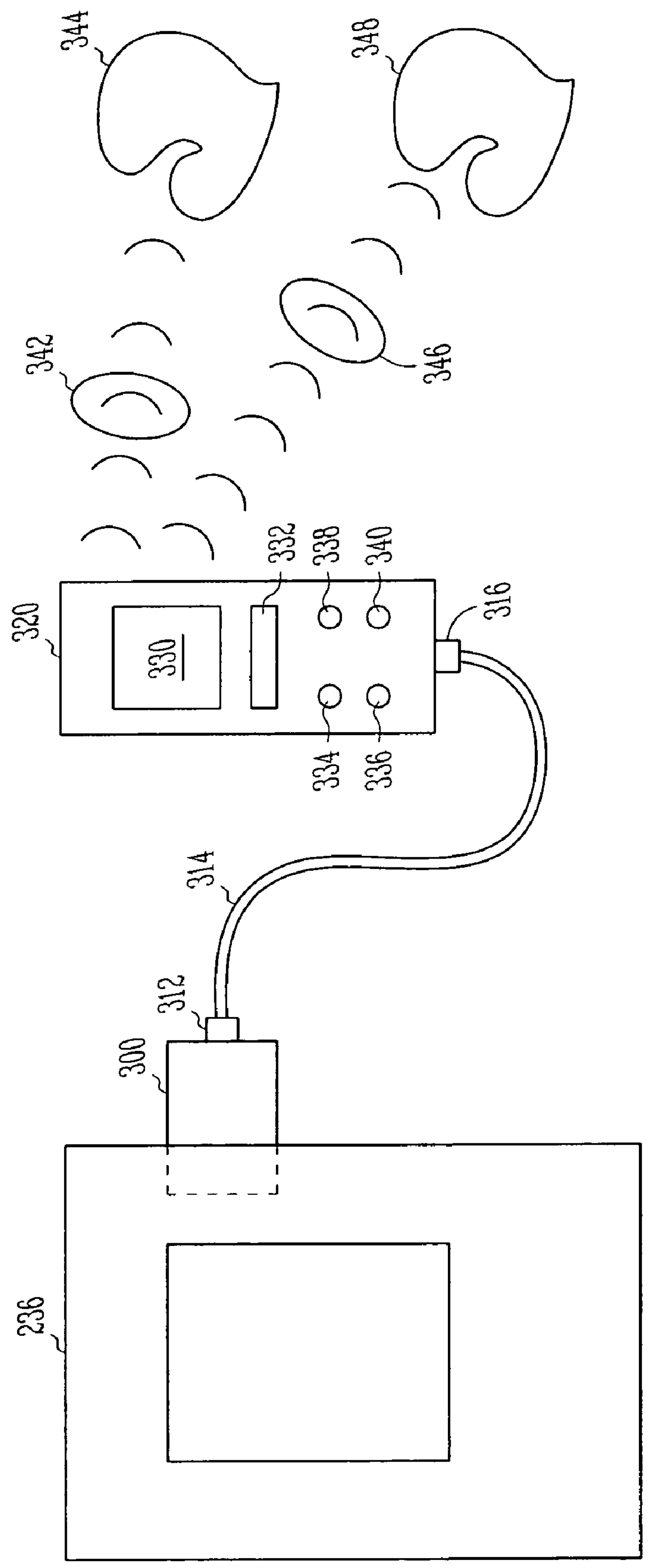
FIG. 9 is a functional diagram illustrating selective control programming of hearing aids utilizing a portable multiprogram unit.

FIG. 9 is a functional diagram illustrating selective controlled programming of hearing aids utilizing a portable multiprogram unit. As shown, a host 236 has PCMCIA Card 300 installed therein, and intercoupled via cable 314 to the Portable Multiprogram Unit 320. The PMU is a programmable transmitter of a type available commercially and has a liquid crystal display (LCD) 330, a set of controls 332 for controlling the functionality of the PMU, and program select buttons 334, 336, 338 and 340. The operational controls 332 are utilized to control the state of PMU 320 to receive hearing aid program signals for storage via line 314, and to select the right or left ear control when transmitting. The programs are stored in Electrically Erasable Programmable Read Only Memory (EEPROM) and in this configuration will hold up to four different programming selections.

The PMU 320 can be disconnected from cable 314 and carried with the patient once the hearing aid programs are downloaded from the Host 236 and stored in the PMU.

The PMU 320 includes circuitry and is self-powered for selectively transmitting hearing aid program information via a wireless link 342 to a hearing aid 344, and via wireless transmission 346 to hearing aid 348.

The hearing aids 344 and 348 for a user are available commercially and each include EEPROM storage for storing the selected then-active hearing aid program information. This arrangement will be described in more detail below.

The wireless link 342 and 346 can be an infrared link transmission, radio frequency transmission, or ultrasonic transmission systems. It is necessary only to adapt the wireless transmission of PMU 320 to the appropriate program signal receivers in hearing aids 344 and 348.

Figure 10:
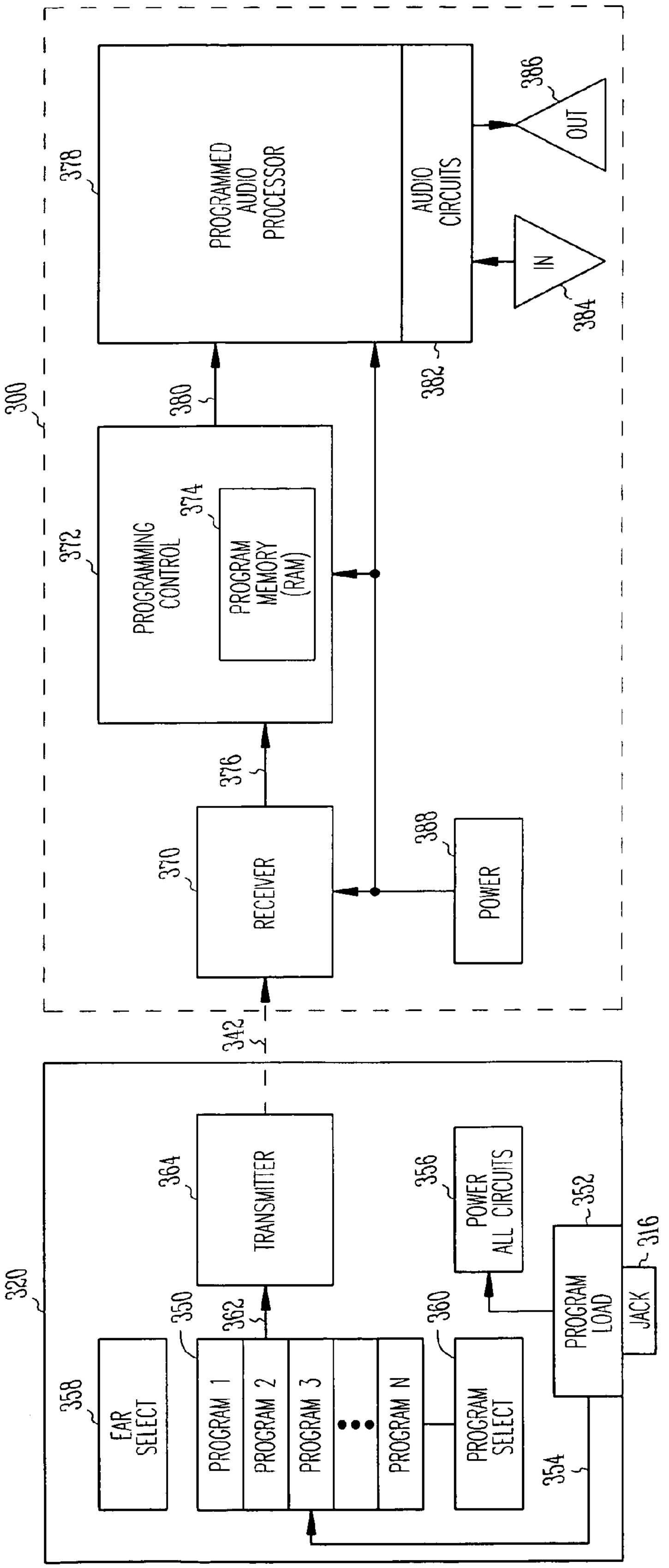
FIG. 10 is a function block diagram of the portable multiprogram unit programming a hearing aid.

FIG. 10 is a functional block diagram of the portable multiprogram unit programming a hearing aid. The PMU 320 is shown communicating to a hearing aid shown within dashed block 344, with wireless communications beamed via wireless link 342. As illustrated, an EEPROM 350 is adapted to receive and store hearing aid programs identified as PROGRAM 1 through PROGRAM n. The Program Load block 352 is coupled to jack 316 and receives the download hearing aid programs for storing via line 354 in the memory 350. The PMU contains its own power source and Power All Circuits 356 applies power when selected for loading the programs to erase the EEPROM 350 and render it initialized to receive the programs being loaded. Once loaded, the cable 314 can be disassembled from jack 316, and the PMU 320 is ready for portable programming of hearing aid 344.

To accomplish programming of a hearing aid, the Ear Select 358 of the controls 332 (see FIG. 9), is utilized to determine which hearing aid is to be programmed.

It will be recalled that it is common for the right and left hearing aids to be programmed with differing parameters, and the portions of the selected program applicable to each hearing aid must be selected.

Once the right or left ear hearing aid is selected, the Program Select 360, which includes selection controls 334, 336, 338 and 340, is activated to select one of the stored programs for transmission via line 362 to Transmitter 364. The patient is advised by the hearing professional which of the one or more selectable hearing aid programs suits certain ambient conditions. These programs are identified by respective ones at controls 334, 336, 338 and 340.

The hearing aid to be programmed is within block 344, and includes a receiver 370 that is responsive to transmitter 364 to receive the wireless transmission of the digital hearing aid program signals provided by PMU 320. A Programming Control 372 includes a Program Memory 374, which can be an addressable RAM. The digital signals received after Receiver 370 are provided on line 376 to the Programming Control 372 and are stored in the Program Memory 372. Once thus stored, the selected program remains in the Program Memory until being erased for storage of a next subsequent program to be stored.

The Program Audio Processor 378 utilizes the Programming Control 372 and the Program Memory 374 to supply the selected stored PROGRAM signals transmitted on-line 380 to adjust the parameters of the Audio Circuits 382 according to the digitally programmed parameters stored the Program Memory 374. Thus, sound received in the ear of the user at the Input 384 are processed by the Programmed Audio Circuits to provide the conditioned audio signals at Output 386 to the wearer of the hearing aid 344.

Power 388 is contained within the hearing aid 344 and provides the requisite power to all circuits and components of the hearing aid.

In operation, then, the user can reprogram the hearing aids using the PMU 320 to select from around the stored hearing aid programs, the one of the stored programs to adjust the programming of the user's hearing aids to accommodate an encountered ambient environmental hearing condition. Other ones of the downloaded stored programs in the PMU can be similarly selected to portably reprogram the hearing aids as the wearer encounters different ambient environmental conditions. Further, as hearing changes for the user, the PMU 320 can be again electrically attached to the PCMCIA Card 300 and the hearing aid programs adjusted by the hearing professional using the Host 236, and can be again downloaded to reestablish new programs within the PMU 320.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. A hearing aid programmer for programming hearing aids, the hearing aid programmer comprising:

a connector having lines to receive data signals from a host computer, the connector configured to operatively couple and decouple the hearing aid programmer to and from the host computer;

a memory to store hearing aid programming software operatively received from storage in the host computer;

a processor coupled to the memory, the processor configured to receive the data signals from the connector;

a first interface coupled to the processor, the first interface configured to operatively couple and decouple the hearing aid programmer to and from a hearing aid, the hearing aid external to the hearing aid programmer; and a second interface to couple to a portable unit, the second interface coupled to the processor to pass control signals from the portable unit to the processor arranged to utilize the control signals to download the hearing aid programming software to the portable unit, the portable unit being configured to program the hearing aid, the portable unit separate from the hearing aid programmer and separate from the hearing aid.

2. The hearing aid programmer of claim 1, wherein the memory is configured to store the hearing aid program software received from the host computer during at least an initialization phase of a hearing aid programming operation.

3. The hearing aid programmer of claim 1, wherein the memory is configured as nonvolatile memory to store the hearing aid programming software to program the hearing aid.

4. The hearing aid programmer of claim 1, wherein the connector having lines is treated as a serial data port.

5. The hearing aid programmer of claim 1, wherein the memory and the processor are configured to read information from the hearing aid.

6. The hearing aid programmer of claim 5, wherein the memory and the processor are configured to determine, from the information, a level at which to apply analog voltage signals to the hearing aid.

7. The hearing aid programmer of claim 6, wherein the memory and the processor are configured to apply the analog voltage signals selectively to a left hearing or a right hearing aid.

8. The hearing aid programmer of claim 1, wherein the interface is configured to couple to a left hearing and a right hearing aid.

9. A system for programming hearing aids, the system comprising:

an apparatus, the apparatus including:

a connection having lines to receive data signals from a host computer, the connection configured to operatively couple and decouple the apparatus to and from the host computer;

a processor to receive the data signals from the connection and to interact with the host computer to receive programming software in the apparatus, the programming software including a hearing aid program to program a hearing aid, the hearing aid external to the apparatus; and an interface coupled to the processor; and a portable unit operable to program the hearing aid, the portable unit having a program load block to communicate with the processor through the interface to receive the hearing aid program from the apparatus, the portable unit having memory operatively coupled to the program load block to store the hearing aid program to program the hearing aid, the portable unit being separate from the apparatus and separate from the hearing aid.

10. The system of claim 9, wherein the portable unit includes circuits to apply power to erase programs in the memory to initialize the memory to receive programs to program a hearing aid.

11. The system of claim 9, wherein the portable unit is configured to couple to the interface with a removable jack.

12. The system of claim 9, wherein the portable unit is configured to receive hearing aid program signals from the interface by a cable coupling the interface to the portable unit.

13. The system of claim 9, wherein the apparatus includes a memory coupled to the processor to provide initialization instructions upon coupling to the host computer.

14. The system of claim 9, wherein the portable unit includes circuitry to provide wireless communications with the hearing aid.

15. The system of claim 9, wherein the interface is configured to provide digital hearing aid programs to the portable unit.

16. An apparatus to program a hearing aid comprising:

an interface configurable as a serial port to receive input from a source external to the apparatus, the input associated with programming the hearing aid, the interface having a connector configured to operatively couple and decouple the apparatus to and from the source;

a processor coupled to the interface;

a program memory coupled to the processor, the program memory to store hearing aid programming software;

a hearing aid interface coupled to the processor, wherein the processor is adapted to programmably generate signals to the hearing aid through the hearing aid interface, the hearing aid being external to the apparatus; and a portable unit interface coupled to the processor, the portable unit interface structured to operatively couple to a portable unit to pass signals between the processor and the portable unit, the portable unit being configured to program the hearing aid, the portable unit separate from the apparatus, separate from the source, and separate from the hearing aid.

17. The apparatus of claim 16, wherein the program memory includes nonvolatile memory.

18. The apparatus of claim 16, wherein the program memory includes volatile memory.

19. The apparatus of claim 16, wherein the hearing aid interface is configured to couple to a right hearing aid and a left hearing aid.

* * * * *

UNITED STATES PATENT AND TRADEMARK OFFICE

CERTIFICATE OF CORRECTION

PATENT NO. : 7,451,256 B2
APPLICATION NO. : 11/036197
DATED : November 11, 2008
INVENTOR(S) : Hagen et al.

It is certified that error appears in the above-identified patent and that said Letters Patent is hereby corrected as shown below:

On the Title page, Item (73), in “Assignee”, line 1, after “Inc.,” insert -- d/b/a Micro-Tech --.

Signed and Sealed this

Twenty-fourth Day of February, 2009

JOHN DOLL

*Acting Director of the United States Patent and Trademark Office*